(12) United States Patent
Amizur et al.

(10) Patent No.: US 12,379,455 B2
(45) Date of Patent: Aug. 5, 2025

(54) SYSTEMS, DEVICES AND METHODS FOR SYNCHRONIZATION

(71) Applicant: Intel Corporation, Santa Clara, CA (US)

(72) Inventors: Yuval Amizur, Kfar Saba (IL); Nir Dvorecki, Herzliya (IL); Ofer Bar-Shalom, Kiryat Ono (IL); Leor Banin, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 600 days.

(21) Appl. No.: 17/640,836

(22) PCT Filed: Sep. 25, 2020

(86) PCT No.: PCT/US2020/052600
§ 371 (c)(1),
(2) Date: Mar. 7, 2022

(87) PCT Pub. No.: WO2021/086525
PCT Pub. Date: May 6, 2021

(65) Prior Publication Data
US 2022/0365168 A1    Nov. 17, 2022

Related U.S. Application Data

(60) Provisional application No. 62/928,380, filed on Oct. 31, 2019.

(51) Int. Cl.
*G01S 7/00*    (2006.01)
*G01S 13/00*    (2006.01)
*G01S 13/931*    (2020.01)

(52) U.S. Cl.
CPC .......... *G01S 7/003* (2013.01); *G01S 13/003* (2013.01); *G01S 13/931* (2013.01); *G01S 2013/9316* (2020.01)

(58) Field of Classification Search
CPC ...... G01S 7/003; G01S 13/003; G01S 13/931; G01S 2013/9316
(Continued)

(56) References Cited

U.S. PATENT DOCUMENTS 6,218,979 B1    4/2001    Barnes et al.
8,599,038 B2 *  12/2013   Yamashiro ............... G08G 1/22
                                                      340/904
(Continued)

FOREIGN PATENT DOCUMENTS

KR    20150133472 A    11/2015
WO    WO-2019190788 A1 *    10/2019    ........... G01S 13/343

OTHER PUBLICATIONS

International Search Report issued for the corresponding International Application No. PCT/US2020/052600, dated Jan. 8, 2021, 2 pages (for informational purposes only).
(Continued)

*Primary Examiner* — Nuzhat Pervin
(74) *Attorney, Agent, or Firm* — Viering, Jentschura & Partner mbB

(57) ABSTRACT

An apparatus for radar synchronization may include a local radar device configured to transmit and receive radar signals; a wireless device configured to wirelessly transmit and receive data; at least one processor operably coupled to the wireless device and the radar device, and the at least one processor configured to perform a method including obtaining local radar information regarding one or more radar pulses sent and/or received by the local radar device; and obtaining neighboring radar information associated with radar pulses sent and/or received from one or more neighboring radar devices; and updating a radar data structure using the obtained local and neighboring radar information, wherein the radar data structure comprises radar information for each of a plurality of radar pulses transmitted by the local
(Continued)

radar device and/or the one or more neighboring radar devices.

25 Claims, 11 Drawing Sheets

(58) Field of Classification Search
USPC .......................................................... 342/58
See application file for complete search history.

(56) References Cited

U.S. PATENT DOCUMENTS

| | | | | |
|---|---|---|---|---|
| 8,836,574 B2* | 9/2014 | Grau Besoli | ............ | H01Q 3/30 |
| | | | | 342/165 |
| 10,408,917 B2* | 9/2019 | Ye | ............ | G01S 5/021 |
| 10,571,224 B2* | 2/2020 | Holder | .................... | F41G 7/303 |
| 10,591,584 B2* | 3/2020 | Bialer | .................. | G01S 7/4004 |
| 10,725,151 B1* | 7/2020 | Ray | ............ | G01S 7/021 |
| 11,269,054 B2* | 3/2022 | Arbabian | ............... | G01S 7/4008 |
| 11,971,258 B2* | 4/2024 | Liu | .................... | G01C 21/3826 |
| 2009/0253526 A1* | 10/2009 | Koudele | ................. | A63B 43/00 |
| | | | | 473/409 |
| 2011/0199191 A1* | 8/2011 | Buckner | ............ | G06K 7/10297 |
| | | | | 340/10.51 |
| 2013/0124404 A1* | 5/2013 | Horstemeyer | ......... | G06Q 20/40 |
| | | | | 705/333 |
| 2013/0138271 A1* | 5/2013 | Danielsson | ............. | H04L 69/28 |
| | | | | 701/3 |
| 2013/0265189 A1* | 10/2013 | Chang | .................. | G01S 13/865 |
| | | | | 342/52 |
| 2013/0285848 A1* | 10/2013 | Grau Besoli | ............ | H01Q 3/40 |
| | | | | 342/134 |
| 2016/0061935 A1* | 3/2016 | McCloskey | ............. | G01S 13/08 |
| | | | | 342/82 |
| 2016/0124075 A1* | 5/2016 | Vogt | ...................... | G01S 13/536 |
| | | | | 342/13 |
| 2016/0335567 A1* | 11/2016 | Petersen | .......... | G06Q 10/06312 |
| 2016/0349354 A1* | 12/2016 | Yomo | .................... | G01S 13/931 |
| 2017/0352281 A1* | 12/2017 | Donovan | .................. | G06F 9/44 |
| 2018/0025631 A1* | 1/2018 | Durekovic | ............. | G08G 1/161 |
| | | | | 701/117 |
| 2018/0074170 A1* | 3/2018 | Ray | ........................ | G01S 7/021 |
| 2018/0074171 A1* | 3/2018 | Ray | ........................ | G01S 7/021 |
| 2018/0120436 A1* | 5/2018 | Smits | ...................... | G01S 17/42 |
| 2018/0356516 A1* | 12/2018 | Fox | ........................ | G01S 13/90 |
| 2019/0020504 A1* | 1/2019 | Ray | ........................ | H04L 27/22 |
| 2019/0069052 A1 | 2/2019 | Al-Stouhi et al. | | |
| 2019/0094333 A1* | 3/2019 | Va | ........................... | G01S 7/023 |
| 2020/0003867 A1* | 1/2020 | Arbabian | ................ | G01S 7/003 |
| 2020/0072636 A1* | 3/2020 | Balakrishna | ....... | G01C 21/3697 |
| 2020/0229065 A1* | 7/2020 | Iwata | ...................... | H04W 4/44 |
| 2020/0300995 A1* | 9/2020 | Wu | ........................ | G01S 13/931 |
| 2021/0041574 A1* | 2/2021 | Lei | ........................ | G01S 13/931 |
| 2022/0200654 A1* | 6/2022 | Baier | ...................... | H04B 1/719 |
| 2022/0321164 A1* | 10/2022 | D'Andrea | ................. | G01S 3/60 |

OTHER PUBLICATIONS

Federal Communications Commission; "Amendment of the Parts 1, 2, 15, 90 and 95 of the Commission's Rules to Permit Radar Services in the 76-81 GHz Band"; Federral Communications Commission; dated Jul. 14, 2017; 52 pages; FCC 17-94.

Leor Banin et al.; "High-Accuracy Indoor Geolocation using Collaborative Time of Arrival"; dated Sep. 2017, 14 pages; IEEE 802.11.

SAE International; "Surface Vehicle Standard", dated Jul. 2020; 267 pages.

Thoma, Reiner S. et al., "Cooperative Passive Coherent Location: A Promising 5G Service to Support Road Safety", IEEE, IEEE Communications Magazine, Sep. 2019, pp. 86-92, vol. 57, Issue 9.

Supplementary Search Report issued for the corresponding European patent application No. 20 88 0814, dated Oct. 13, 2023, 18 pages (for informational purposes only).

* cited by examiner

FIG. 5

| PID | ToD | AoD | TX MAC | ToA | Doppler | AoA | RX MAC |
|---|---|---|---|---|---|---|---|
| 1551 | 199678 | 56 | 10:01 | | | | |
| 2309 | 933101 | 120 | 10:03 | 150771 | 10:01 | 140 | 10:01 |
| 6678 | 199678 | 45 | 10:02 | 120554 | 10:01 | 83 | 10:01 |
| 1550 | 83760 | 10 | 10:01 | | | | |

500

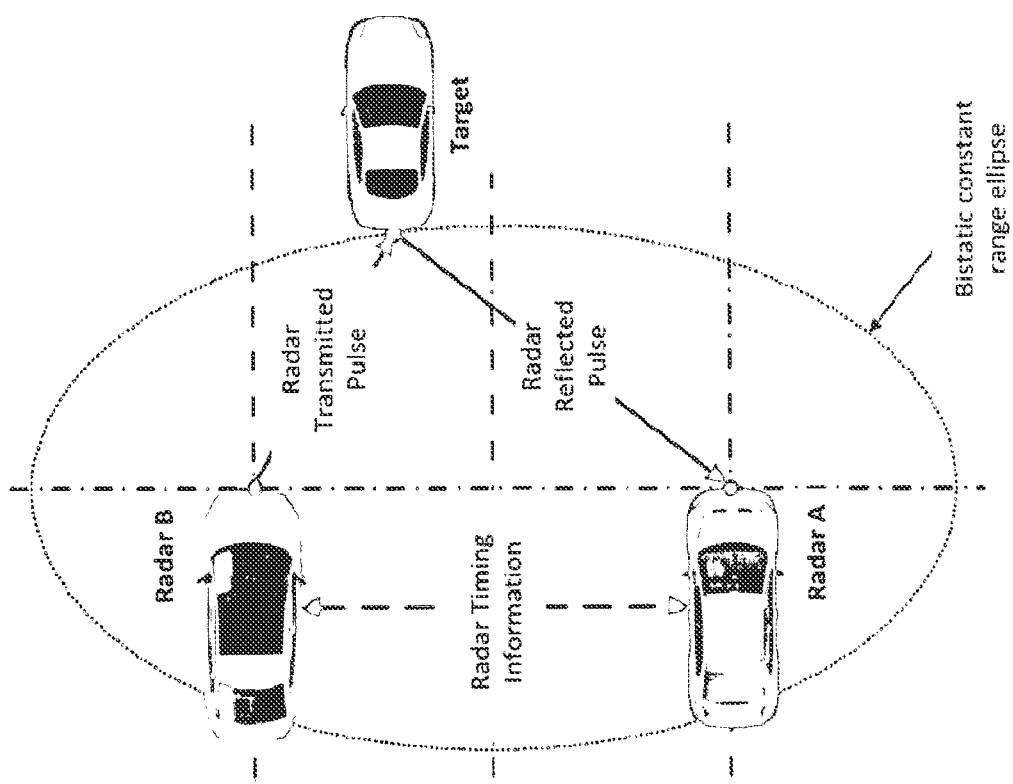

SYSTEMS, DEVICES AND METHODS FOR SYNCHRONIZATION

CROSS-REFERENCE TO RELATED APPLICATIONS

This U.S. non-provisional application is a National Phase of International Application PCT/US2020/052600, which was filed on Sep. 25, 2020, which claims priority to U.S. Provisional Application 62/928,380, filed on Oct. 31, 2019, the entire contents of each of which are hereby incorporated herein by reference.

TECHNICAL FIELD

Various embodiments include systems, devices, and methods generally related to radar synchronization.

BACKGROUND

High resolution vehicular radars are to operate at the 77 GHz-81 GHz band. For example, for autonomous driving, commonly six radars per vehicle are needed to sense the entire 360-degree view. As the usage of these high-definition radars becomes more common, the interference generated by neighbor vehicles operating in the vehicle vicinity, will become a major problem.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 5 shows an exemplary data structure, including radar related data, according to an aspect of the disclosure;

FIG. 11 depicts an example of applying bistatic equations to discern the environment and detect an object.

DESCRIPTION

Figure 1:
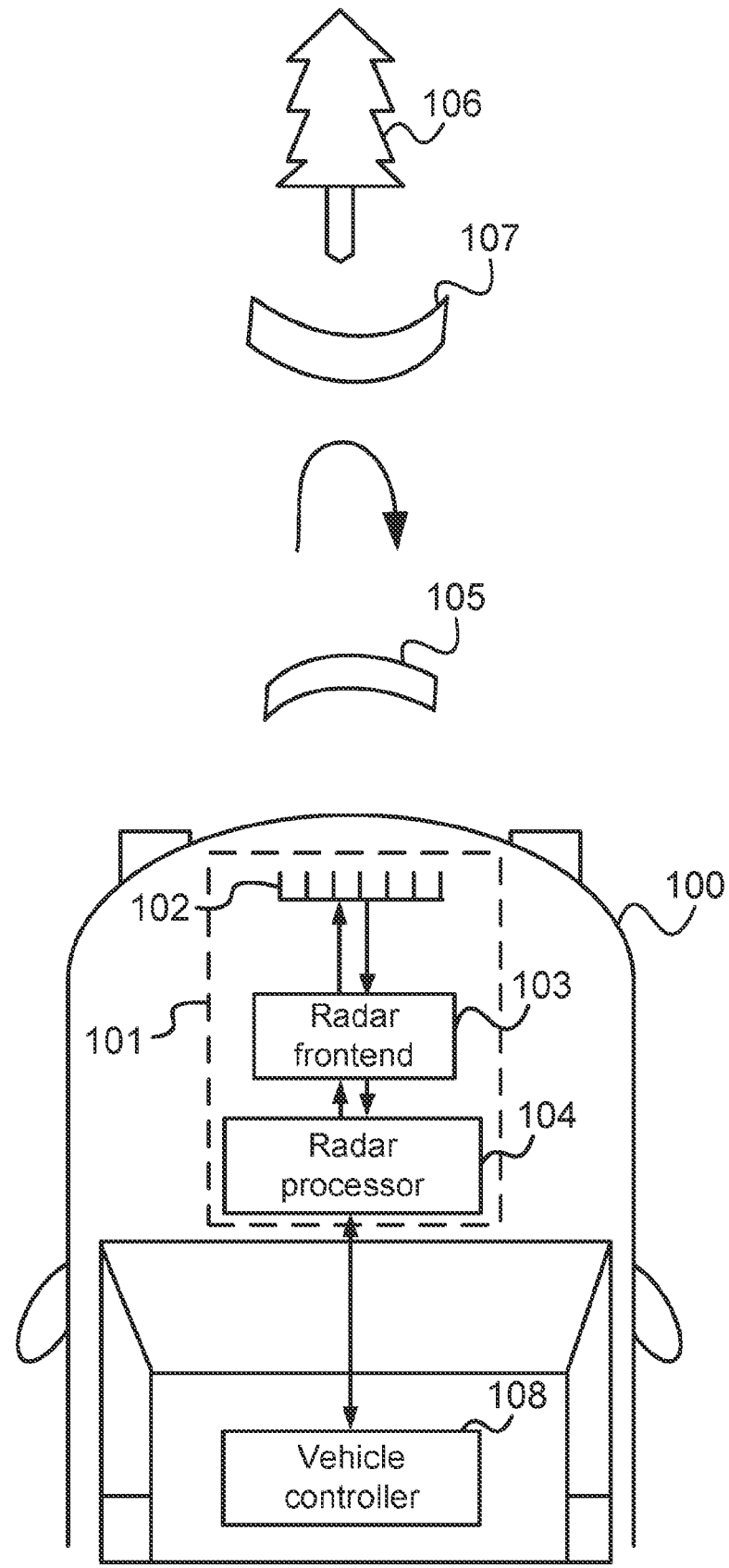
FIG. 1 depicts a vehicle.

The following detailed description refers to the accompanying drawings that show, by way of illustration, exemplary details in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse the ground, e.g., on a street, on a road, on a track, on one or more rails, off-road, etc.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Throughout the present disclosure, the following terms will be used as synonyms: driving parameter set, driving model parameter set, safety layer parameter set, driver assistance, automated driving model parameter set, and/or the like (e.g., driving safety parameter set).

Cooperation between radars may not only minimize their mutual level of interference but may also enable remote radar systems to operate synchronously for jointly improving their performance.

Various embodiments may relate to methods, systems, and devices that aim to solve the RADAR interference problem along with improving the accuracy, reliability and spoofing resilience of the solution. In various embodiments, the concept of collaborative time of arrival (CToA) may be applied to automotive radar systems to achieve nanosecond-level synchronization for the so-called cooperative radar (CoRD). The use of this scheme may be used in further of applications including bistatic radars.

In order to harness the interferences to improve the solution to RADAR interference, various embodiments utilize Cooperative Radar (CoRD). According to CoRD, a first or local radar device (e.g., a device that can receive and transmit radar signals) may listen not only to the back-scattered pulses resulting from its own transmissions, but also to the transmissions and back-scattered pulses coming from other radars nearby. In order to enable other radars devices (e.g., the nearby radar devices) to utilize the transmissions sent and received by the first radar, some information regarding the transmission sent and received by the first radar may be sent (e.g., via a broadcast channel) to the other radar devices.

For example, the radar devices may share their device ID with each other. This information may enable each radar device to extract angular information of each of its neighbor devices and track it. This information can be cross-checked against the classic radar "image" in order to validate targets, thereby detecting which target is real and is not a result of multi-path.

Further, the radar devices may share timing information (e.g., information related timing of sent/received radar signal transmissions) which may enable:

Full target tracking—track the range and angular information of neighbor devices which means that a reliable map of the vehicles in the vicinity can be obtained, similar to the air traffic control map.

Bi-static radar information extraction—Bi-static radar is the name given to a radar system including a transmitter and a receiver that are separated by a distance comparable to the expected target distance.

Reduce/eliminate spoofing: The cooperation between all devices makes spoofing almost impossible as it requires generating false signals not only locally, for one of the Radar devices, but for all the devices in the scene.

Assuming that the radar device transmitting a radar pulse provides its time of transmission to a neighboring device (e.g., a radar device in a vehicle) that receives the pulse after being reflected back from a target, the bi-static radar equations can be easily applied. This can enable sensing of the environment from many points of view instead of only a single one, as in the classic mono-static radar (i.e., a radar in which the transmitter and receiver are collocated).

FIG. 1 shows a vehicle 100. The vehicle 100 includes a radar device 101 that includes an antenna arrangement 102, a radar frontend 103 and a radar processor 104. The radar frontend 103 for example includes one or more (radar) transmitters and a one or more (radar) receivers. The antenna arrangement 102 may include multiple transmit antennas in the form of a transmit antenna array and multiple receive antennas in the form of a receive antenna array or one or more antennas used both as transmit and receive antennas. In the latter case, the radar frontend 103 for example includes a duplexer (i.e. a circuit to separate transmitted signals from received signals).

For the detection of an object 106, the radar processor 104 transmits, using the radar frontend 103 and the antenna arrangement 102, a radio transmit signal 105. The radio transmit signal 105 is reflected by the object 106 resulting in an echo 107. The radar device 101 receives the echo 107 and the radar processor 104 calculates information about position, speed and direction of the object 106 with respect to the vehicle 100. The radar processor 104 may then for example supply this calculated information to a vehicle controller 108 of the vehicle 100, e.g for autonomous driving of the vehicle 100. For example, the radar device 101 may be installed in a vehicle for detection of nearby objects, in particular for autonomous driving.

Figure 2:
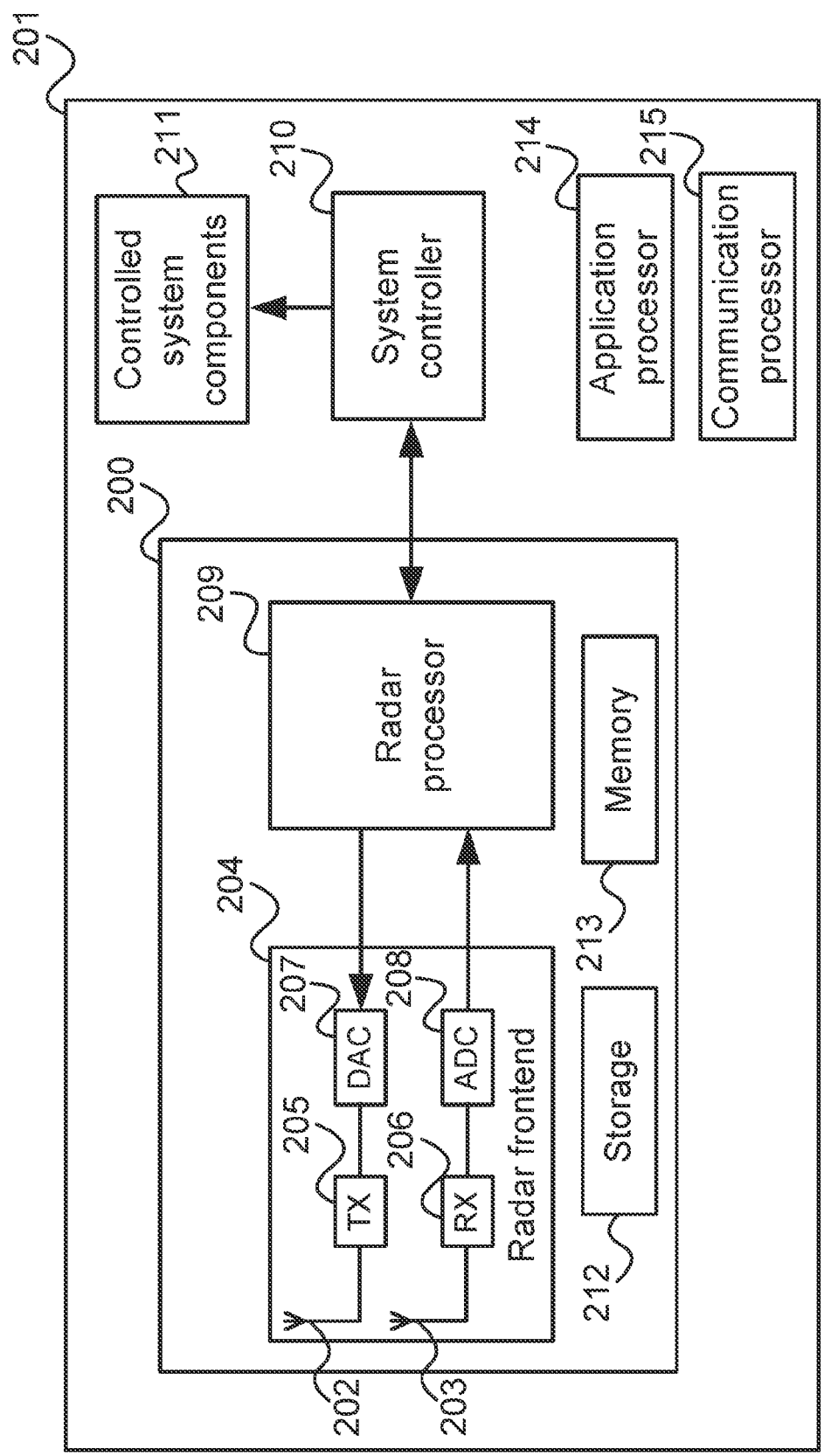
FIG. 2 depicts a radar device 200.

FIG. 2 shows a radar device 200. The radar device 200 is part of a system 201, which, as in the examples above, may for example be a vehicle. The radar device 200 includes an antenna arrangement, which in this example includes one or more transmit antennas 202 and one or more receive antennas 203. The radar device 200 further includes a radar frontend 204 and a radar processor 209. The one or more transmit antennas 202 are coupled with a transmitter (or transmitter arrangement) 205 of the radar frontend 204. The one or more receive antennas 203 are coupled with a receiver (or receiver arrangement) 206 of the radar frontend 204. The transmitter 205 may for example include an oscillator and a power amplifier to generate radio transmit signals.

The receiver 206 for example includes one or more mixers and one or more filters for down-converting radio signals received via the one or more receive antennas. The radar processor 209 supplies digital radar transmit data values to the radar frontend 204. The radar frontend 204 includes a digital-to-analog converter (DAC) 207 which converts the digital radar transmit data values to an analog transmit signal. The transmitter 205 converts the analog transmit signal to a radio transmit signal which it transmits via the one or more transmit antennas 202. The receiver 206 converts a radio receive signal received via the one or more receive antennas 203 to an analog receive signal. The radar frontend 204 includes an analog-to-digital (ADC) converter 208 which generates digital radar reception data values from the analog receive signal which it supplies to the radar processor 209. The radar processor detects one or more objects using the digital radar reception data values. This detection may include the determination of information including one or more of range, speed and direction of the one or more objects with respect to the system 201.

The radar processor 209 for example supplies the determined information to a system controller 210 (e.g. a vehicle controller or robot controller) which controls controlled system components 211 of the system 201 (e.g. a motor, a brake, steering etc.), e.g. by means of corresponding actuators. The radar device 200 may include a storage 212 or a memory 213, e.g. storing digital radar reception data values being processed by the radar processor 209. The system 201 may for example include an application processor 214 and a communication processor 215 or both which may for example at least partially implement the system controller 210 and perform communication between the system controller 210, the radar device 200 and the controlled system components 211.

Figure 3:
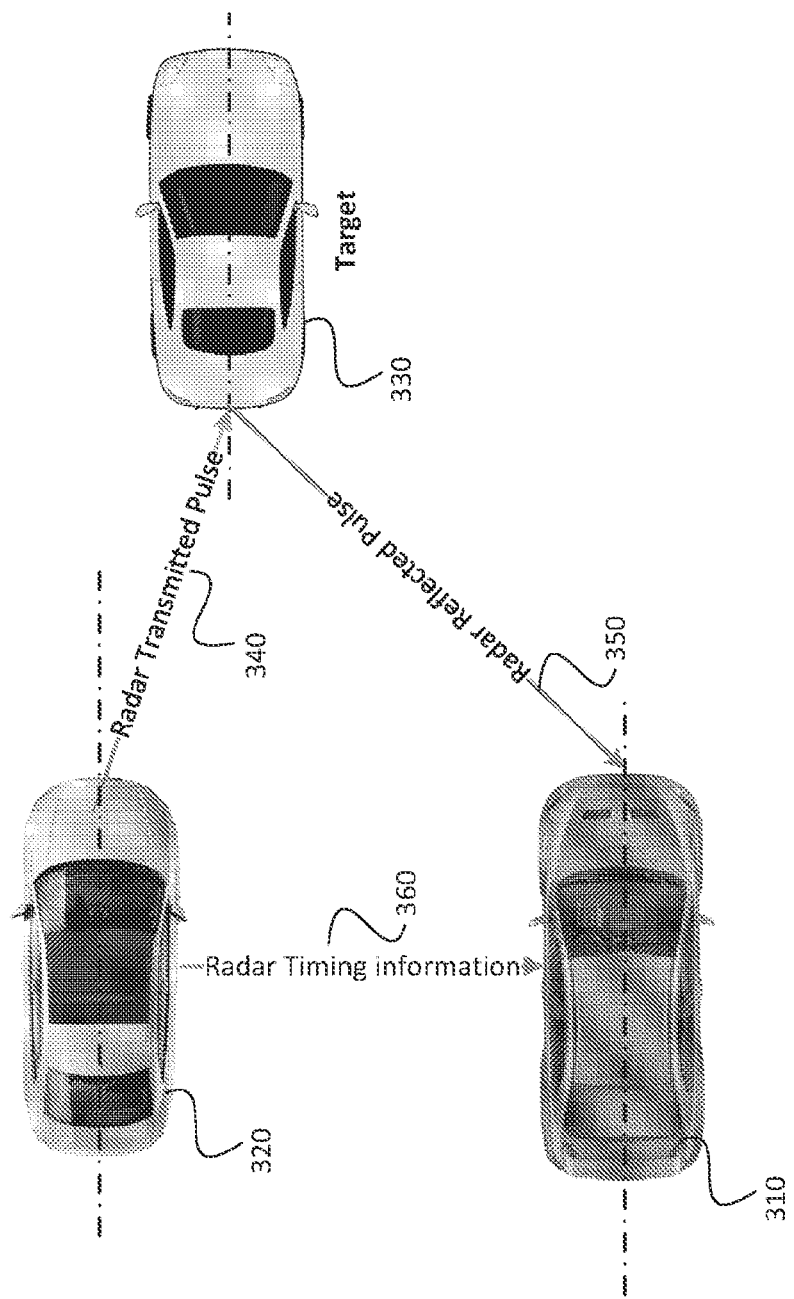
FIG. 3 depicts an example of bi-static radar implementation.

FIG. 3, shows an example of how the bi-static radar concept may be implemented. In FIG. 3, a first radar device 310 may be incorporated in a vehicle may receive a radar pulse from a second radar device 320 (also incorporated in a vehicle). In particular, the second radar device transmits a radar pulse 340, which reflects off a target 330. The first radar device 310 receives the reflected/backscattered radar pulse 350. Additionally, the second radar device 320 transmits information 360 regarding the radar pulse 350 received by the first radar device, e.g., timing information (e.g., when the radar pulse 340 was transmitted). Other information may be included in the information 360 such as identification information identifying the transmitter of the pulse 340/350, position information (e.g., position coordinates) indicating position of transmitter (in this case the position of the second radar device 320), etc. With the received pulse 350 and the received information 360, the first radar device 310 may use bi-static radar equations for various applications.

Figure 4:
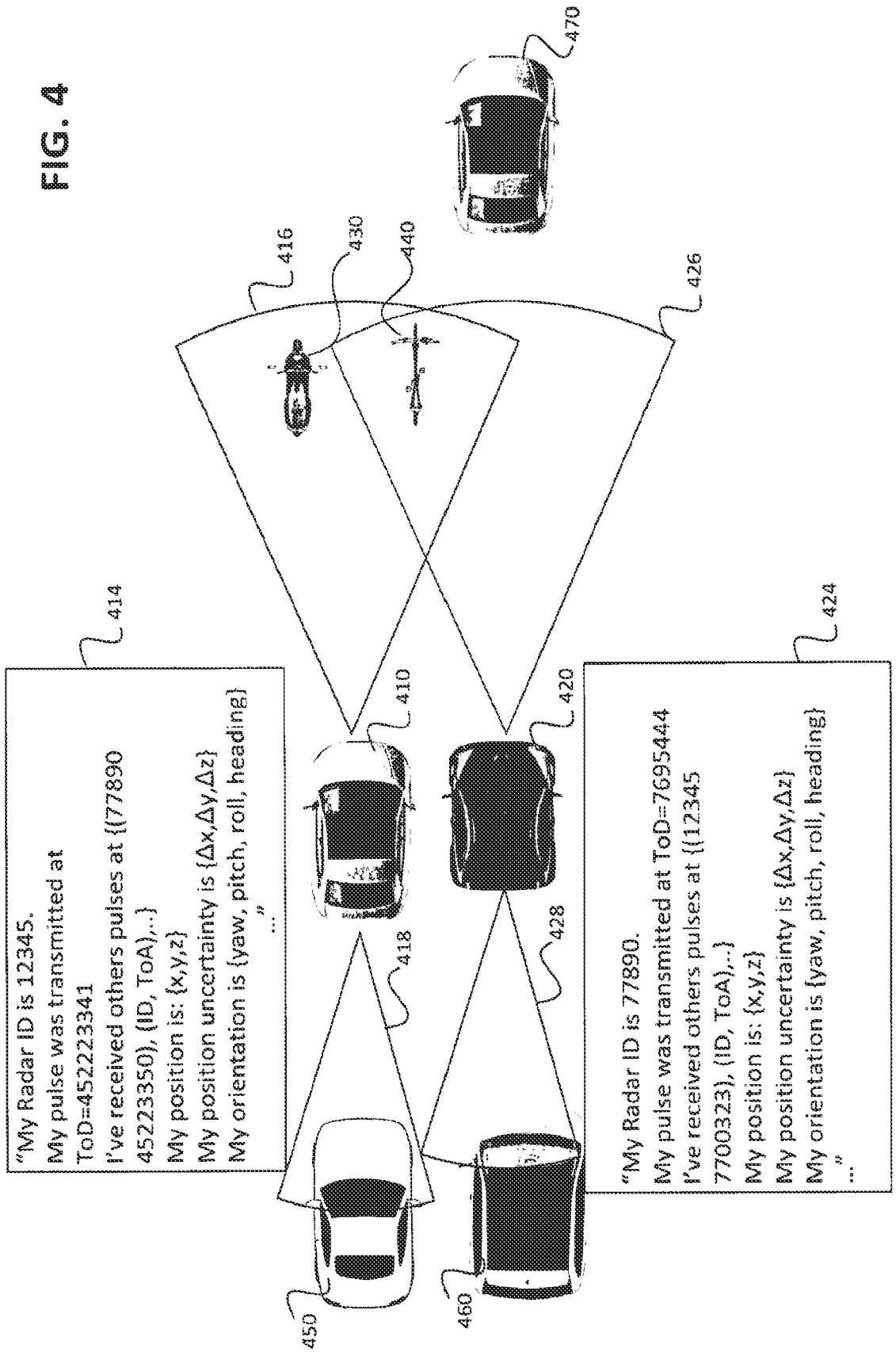
FIG. 4 shows an exemplary depiction of cooperative radar (CoRD)

FIG. 4, shows, according to an exemplary embodiment, an exemplary depiction of cooperative radar (CoRD). FIG. 4 shows a road including several objects. In one or more examples, vehicle 410 and vehicle 420 each include radar devices and other suitable equipment or components for implementing CoRD. As explained, a CoRD or a CoRD scheme can be implemented with a radar that receives/ listens to radar transmissions coming from other radars and using those transmissions and using certain information. Implementation of CoRD can enhance the performance and reliability of all the RADARs in the vicinity. To enable CoRD, a tiny portion of the bandwidth/time may be allocated for "RADAR data-plane" and calculation(s) similar to Collaborative Time of Arrival (CToA) (a Wi-Fi protocol, enabling high accuracy, GPS-like, indoor navigation and object tracking) may be implemented in the CoRD scheme.

In FIG. 4, each vehicle participating in the CoRD protocol or implementation may transmit or send out radar pulses and also may send out radar information regarding those radar pulses. In the example of FIG. 4, the vehicles 410 and 420 which are in the vicinity of each other may have radar devices and may be participating in a CoRD scheme. As shown, the vehicle 410 may transmit (e.g., repeatedly) radar pulses 416 and 418. Similarly, the vehicle 420 may transmit (e.g., repeatedly) radar pulses 426 and 428. The radar pulses 416, 418, 426, and 428 may hit and reflect off various objects such as the vehicles 430-470. Accordingly, the vehicles 410 and 420 may receive backscattered radar transmissions sent from their own radar devices, but also the backscattered or reflected transmission from other radar devices. That is, vehicle 410 may receive the radar transmissions from vehicle 420 that have been reflected and vehicle 420 may receive the reflected radar transmissions from vehicle 410.

Further, each of the vehicles participating in the CoRD scheme, in this case vehicles 410 and 420, may transmit radar information regarding the radar pulses each of the radar devices has received and/or transmitted. In addition, the transmitted information may include identifying information (e.g., an ID) for each radar device. For example, as shown in FIG. 4, the vehicle 410 transmits information 414 including an ID (12345) for the radar device of vehicle 410, the time(s) or timestamp(s) of the radar pulse transmitted by the radar device of vehicle 410 as well as the times/timestamps of the radar pulses received. The information may further include a positon regarding the vehicle or radar device, the amount of uncertainty of the position, and the orientation of the vehicle/radar device of the vehicle. FIG. 4 shows the vehicle 420 also transmitting similar information 424 from its own perspective.

For enabling sharing of information between devices, a broadcast channel may be used without the need for peer to peer communication. In other embodiments, peer to peer communication may be used.

According to at least one exemplary embodiment, information for CoRD (e.g., radar identification information, radar timing information, and/or other related information) may be transmitted in-band, e.g., as part of the radar transmission(s). For example, data including the information may be added to a small portion of a radar frame or frames of the transmitted radar pulses. Since this data can be attached directly to the radar frame no association problem exists. That is there is no difficulty or need to match between data frames and radar frames because the data is in the radar frames. The very high dynamic range of radars can enable reliable reception of the data and high bandwidth may allow the radar devices to transmit a large amount of data. However, in such a case, each radar device may include a radar modem for encoding and decoding the data from the radar pulses.

In other examples, the information (e.g., radar identification information, radar timing information, and/or other related information), may be transmitted separately from the radar signal transmission. In other words, this data including the information needed for CoRD implementation may be transmitted out-of-band or in an off-radar or non-radar channel. For example, the data may be transmitted through any suitable wireless means including WLAN, (e.g., WiFi), a vehicular Basic Safety Message (BSM) (e.g., SAE J2735 BSM), and/or through cellular-based means (e.g., LTE, 5G, 3GPP V2X, etc.). Using the out-of-band means to transmit the information for the CoRD may not require redefining a Medium Access Control layer (MAC) or redefine the physical (PHY) layer and can allow for using existing infrastructure for conveying messages (e.g., broadcast messages). However, the bandwidth of the out-of-band means may be more limited in terms of bandwidth and also requires each vehicle or device to match associate received data packets including radar information with the radar pulses or radar frames/radar pulses from the radar device.

In other examples, both in-band and out-of-band approaches may both be used together or separately at different times where appropriate. For example, the in-band and out-of-band approach may include different parts of the information needed or used in the CoRD scheme. In at least one example, radar frame(s) of the transmitting radar signals may only contain minimal data (e.g., radar device ID) with the other needed information being conveyed out-of-band.

FIG. 4 is merely exemplary in several aspects. For example, the directivity, beam width, and other characteristics of the transmitted radar pulses may be different. Further, a vehicle including a radar device may transmit more radar pulses (e.g., front back, side, etc.). Additionally, the information regarding each radar device or node may be transmitted as a data structure, e.g., a table or ledger.

That is, in exemplary embodiments of implementing CoRD, each radar node may transmit information about the time of departure (ToD) of its own radar frames (in its own local time-base), along with the time of arrival (ToA) of the radar frames which were sent by its neighbors over the past few seconds (also in its local time-base). Each node/device then may construct a radar data structure/table including at least the ToAs and ToDs as seen by each device in the ad-hoc network and by doing so, to follow all the clocks in the network. Further, the frequency shift (which resulted from Doppler+clock drift), as measured on each received frame may also be included the data structure, along with the ToAs.

FIG. 5, shows according to at least one exemplary embodiment of the present disclosure, an exemplary data structure including radar related data. As shown in FIG. 5, the data structure 500 includes information that may be transmitted for implementing a CoRD scheme. That is the data structure 500 may contain parameters regarding its radar transmissions and receptions. The data structure can be updated over time as more information is obtained. The data structure 500 in FIG. 5 may be implemented as a table or ledger. Each device participating in a CoRD scheme (e.g., the radar devices mentioned in connection with FIG. 4) may keep (e.g., locally stored) or at least have access to such a data structure for further processing or use.

As shown, the information in the data structure 500 may include certain information associated with each of plurality of radar pulses transmitted and/or received by a particular radar device. The data structure 500 can include an identification, e.g., a packet ID (PID) identifying the packet including information for each transmitted and/or received radar signals/pulses). Further, for each radar pulse, there is may be timing information, such as time-of-arrival (ToA) and time-of-departure (ToD). Spatial information (e.g., from sensors) regarding radar pulses, including, for example, angle-of-departure (AoD) and angle-of-arrival (AoA) can also be included. Doppler information (Doppler), that is the Doppler frequency offset may be included. Also position information may be included (not shown) which may provide an estimate of the position of the radar device (node position). The identity of the device that transmits and receives each of the radar pulses may be identified e.g., by a MAC address. Thus, the data structure 300 includes a field for transmitter MAC (TX MAC) that identifies the transmitter of the radar pulse and a field for receiver MAC (RX MAC) that identifies the receiver of the radar pulse.

The data structure 500 may be shared by one node (e.g., vehicle/radar device) with the other nodes (e.g., other vehicles/radar devices in the vicinity). In various embodiments, the data structure may be sent on a broadcast channel available to each of the nodes. Such a data structure or ledger can enable the radar nodes to synchronize at nanosecond level and localize the other nodes in their vicinity (e.g. the nodes generate a "Sky map").

Consider N automotive radar nodes operating concurrently on the same frequency band and in close proximity. It may be desired to synchronize each node with the N−1 nodes surrounding it. The synchronization may ideally be performed at a sub-nanosecond level and may enable the node to localize the other nodes (e.g. with respect to its own location).

Figure 6:
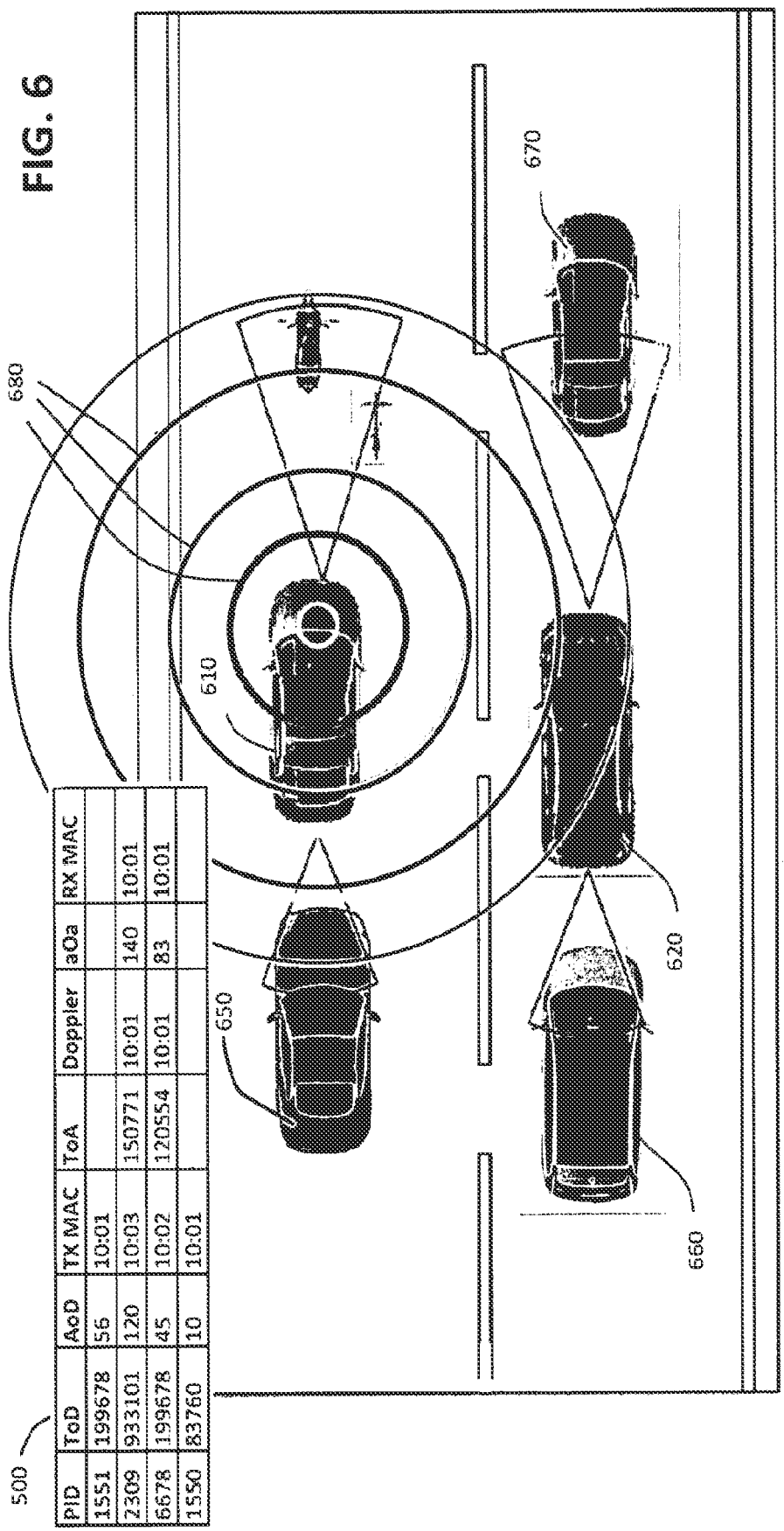
FIG. 6 depicts a radar node generating and maintaining a data structure.

As shown in the example of FIG. 6, a radar node 610 may generate and maintain a data structure, which in this example is the data structure 500 of FIG. 5. This data structure 500 can include radar signal related information that the node 610 obtained, either from its own transmission(s) and reception(s) of radar signals, or from information sent by other (neighboring) radar nodes, at one or more instances or times. In FIG. 6, the node 610, which may be identified with "MAC:10:01", may share its radar information (e.g., its own ledger) with the other nodes.

In various embodiments, the node 610 sends the information/data structure 500 or a portion thereof, via a broadcast channel 680. The other nodes/vehicles 620, 650, 660, and/or 670 can receive the information or data structure 500 from the broadcast channel 680. The other radar nodes can incorporate the received radar related information with current existing radar data of their own radar data structure or ledger.

Figure 7:
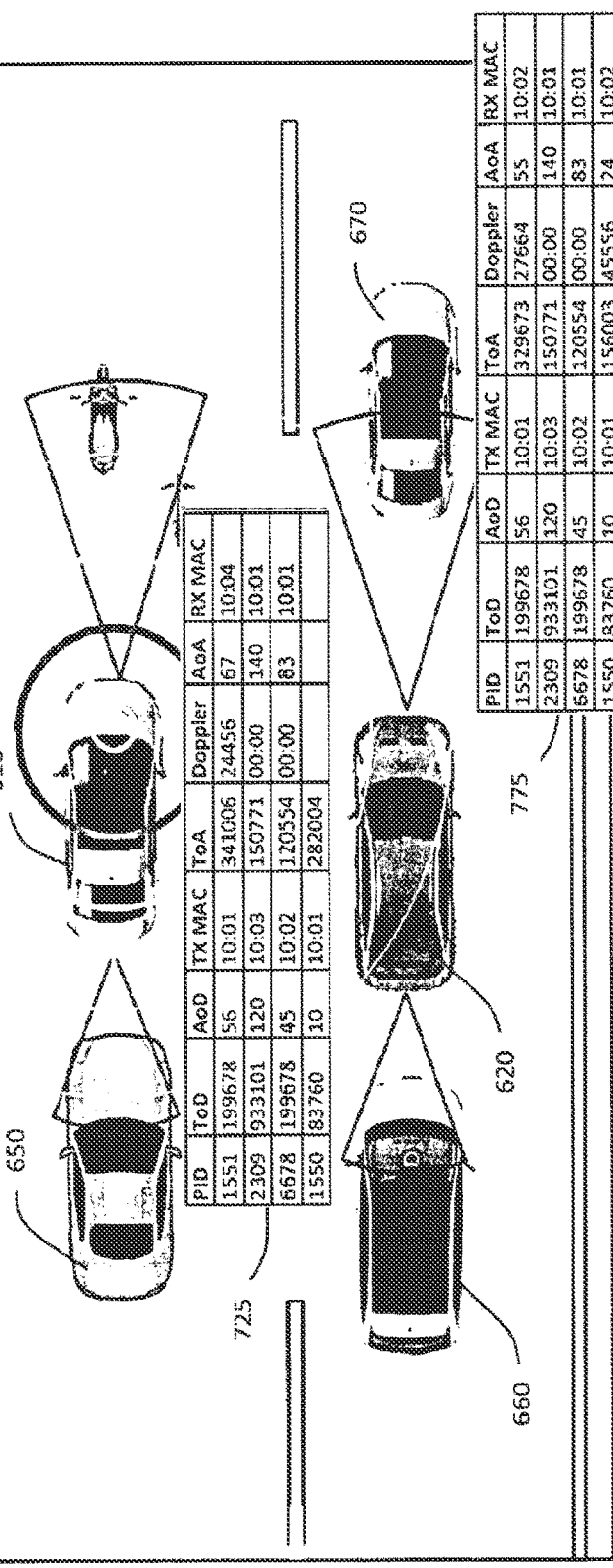
FIG. 7 depicts a radar process after a radar frame has propagated through the channel and has been received by other nodes.

For example, in FIG. 7, the nodes 620 and 670 have received radar signal information from the node 610 and have respectively updated their own radar data, generating updated radar data structures/ledgers, 725 and 775. With this updated information, the 620 and 670 may synchronize with the other nodes (e.g., nodes 610, 650, 660, etc.). In other words, the node that have updated their data structures can utilize procedures/routines e.g., apply a CoRD time synchronization procedure/routine, in order to track its relative position with respect to other nodes in addition to synchronize (in time) with the other nodes.

By way of further example, in a virtual CoRD network including four unsynchronized nodes, each node may be assigned with a (simplified) medium-access control (MAC) addresses, such as, and without limitation, "10:01", "10:02", "10:03" or "10:04". FIG. 6, element 500 includes a time indicated by ToD time-stamp "199678" (measured in picoseconds and referenced to the time-base of node 1 610). This time-stamp of "199678" is the time at which node one 610 may broadcast a radar frame associated with radar frame identification (RFID) "1551". The broadcasting node may also include the angle of departure (AoD) indicating the direction at which its radar beam was steered, and can facilitate the localization of the broadcasting node. The ledger broadcast by node 1 610 may also include the timestamps it has measured for previous broadcasts it received from node 2 670 and node 3 650.

FIG. 7 then illustrates the process after the radar frame has propagated through the channel and was received by the other nodes. For example, node 2 670 has measured this radar signals ToA as "329673" (referenced to its own time-base) and also a corresponding Doppler frequency offset of "27664 Hz" and updates that value in its ledger, along with its own MAC address as the receiving unit. The remaining nodes that receive the radar signal may perform a same or similar operation. Each of the receiving nodes may also measure the angle of arrival (AoA) corresponding to the line-of-sight (LoS) direction at which that radar signal was received. Again, this spatial information may facilitate the location estimation process. The measurements included in the ledger are fed into some estimation routine (e.g., a Kalman filter). The estimation routine yields estimates of all the parameters required for synchronizing to the other nodes in the network. Before being fed, the entries of the ledger may undergo a timestamp matching phase, during which the ToA measurements may be matched with their corresponding ToD value.

Figure 8:
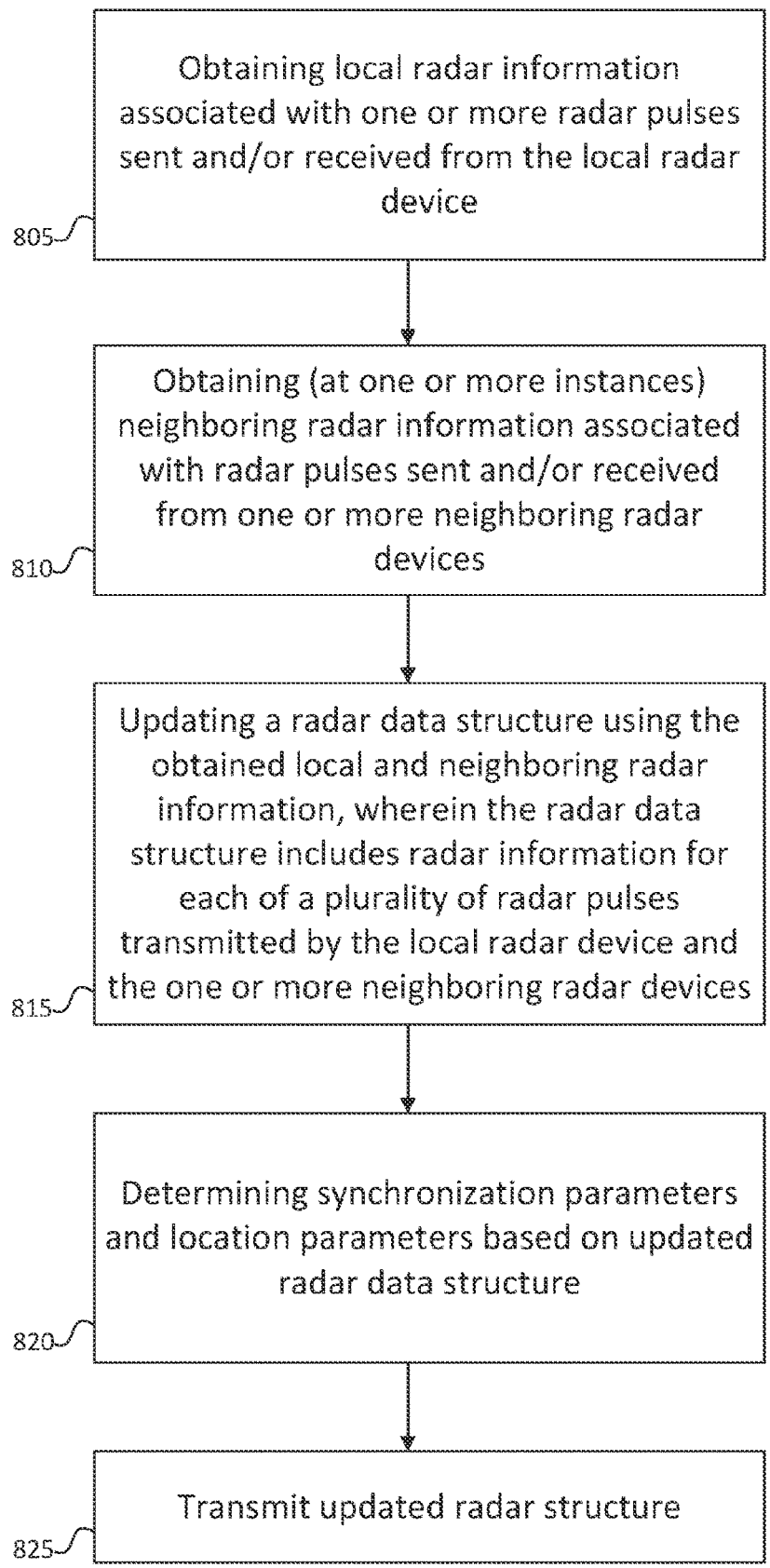
FIG. 8 depicts an exemplary method for synchronization with nodes.

FIG. 8, shows an exemplary method for synchronization with nodes. The method may include obtaining local radar information associated with one or more radar pulses sent and/or received from the local radar device 805; obtaining (at one or more instances) neighboring radar information associated with radar pulses sent and/or received from one or more neighboring radar devices 810; updating a radar data structure using the obtained local and neighboring radar information, wherein the radar data structure includes radar information for each of a plurality of radar pulses transmitted by the local radar device and the one or more neighboring radar devices 815; determining synchronization parameters and location parameters based on updated radar data structure 820; and Transmit updated radar structure 825.

The method may be implemented by a radar node operating in close vicinity of other radar nodes (e.g., within meters of each other). Such a radar node may be realized or implemented like the radar node 900 of FIG. 9. As such, the radar node 900 may include a radar unit 910 which can incorporate a radar transmitter and receiver. Additionally, the radar unit 910 may include a radar modem or the like so as to be able to include data into radar signals (e.g., radar frames of radar pulses) as well as decode or extract data from radar signals. The radar unit 910 may also include antennas/sensors that are configured to detect and receive radar signals. The radar unit 910 may be configured to perform radar or radar signal related measurements, such as determine Doppler frequency/shift, and determine the timing of transmitted and received radar signals or radar pulses.

Figure 10:
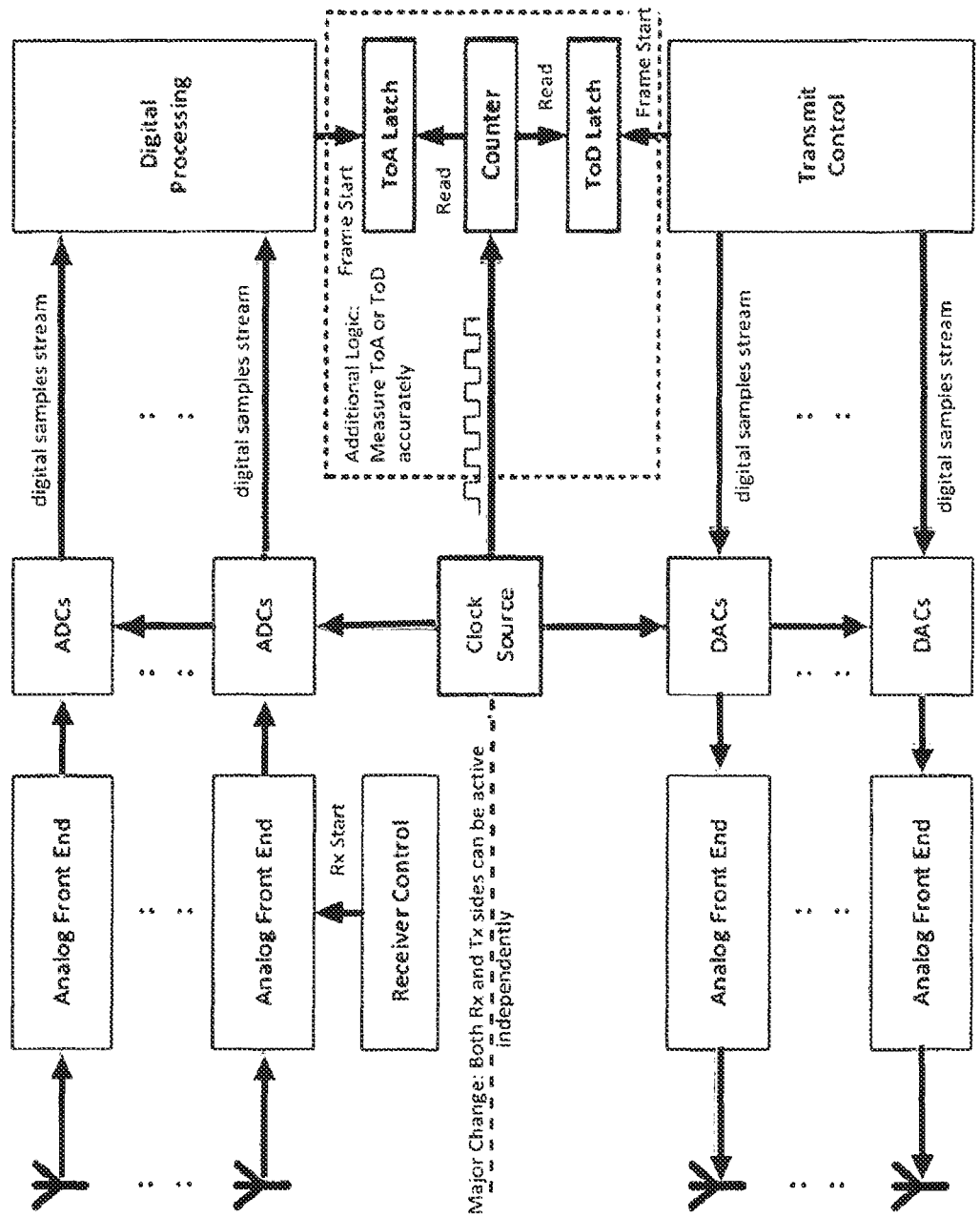
FIG. 10 depicts an exemplary diagram of a radar unit, according to an aspect of the disclosure.

FIG. 10 shows an exemplary diagram depicting some aspects of the radar unit 910. A shown in FIG. 10, the radar unit 910 may include several components and configurations for supporting CoRD. The radar unit may include suitable components for implementing both the receiving and transmitting side. The radar unit may include front end devices, control devices (e.g., transmitter and receiver control), analog-to-digital converters (ADCs), clock devices or sources, and in the example of FIG. 10, the radar unit 910 may include a receiver (RX) path that may be independent from the transmitter (TX) path. That is, the RX path can be operational without enabling the TX path, that is for receiving signal from neighboring nodes. Similarly, the TX path may also be operational without enabling the RX or RX path. Thus, the radar unit may transmit a radar signal for others to receive, but without processing its echoes and thus can conserve power and provide other benefits. As noted the radar unit 910 may determine or measure the timing of a received signal (RX signal) and a transmitted signal (TX signal), arriving or departing accordingly. Therefore, the radar unit 910 may include additional logic or hardware, e.g., processing device(s), processors, and/or logic devices as to accomplish or perform the timing measurements, determine Doppler shifts, and perform other related digital signal processing.

The radar node 900 may include a location unit 920 which may be configured to detect and generate location information regarding the position of the radar node. For example, the location unit 920 may include a Global Navigation Satellite System (GNSS) device or receiver for determining the location or position of the radar node 900.

The radar node 900 may also include a communication unit 930. The communication unit may for transmitting data to other nodes or other devices. For example, the communication unit 930 may include wireless communication device(s) or methods such as WLAN and/or cellular based communication methods. The communication 930 may wirelessly transmit data on a broadcast channel, available to any other suitable communication device.

Further, the radar node 900 may include a processing unit 940. The processing unit 940 may be processing circuitry which may include or be implemented as any suitable processor(s) or logic device(s) including, for example, a microprocessor, a controller, a microcontroller, an embedded processor, a chip multiprocessor (CMP), a coprocessor, a digital signal processor (DSP), an ASIC, a field programmable gate array (FPGA), a programmable logic device (PLD), and the like. The processing unit may include computer readable storage media such as memory capable of storing machine-readable or computer-readable data. For example, the memory may include both volatile memory and non-volatile memory. Some or all of the memory may be included in the same integrated circuit as the processor/logic device or some or all of the memory may be an integrated circuit external to the integrated circuit of the processing unit 940. The other computer readable or machine readable storage may any hard disk drive or equivalent, that is operably coupled to the processor/logic device.

Figure 9:
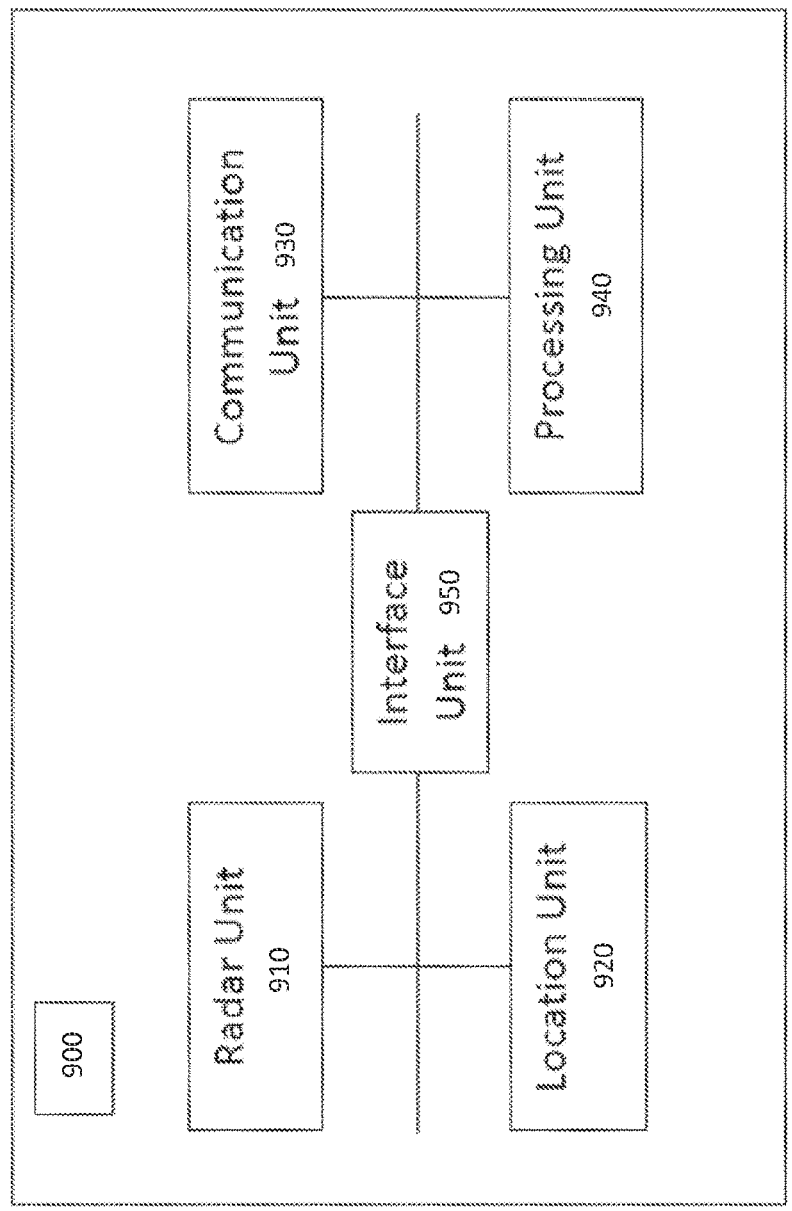
FIG. 9 depicts a realization or implementation of a radar node, according to an aspect of the disclosure.

Further, as shown in FIG. 9, the radar node 900 may include an interface unit 950. The interface unit 950 may include suitable interface circuitry, e.g., hardware and software components, e.g., processing devices, connections (e.g., connection lines, data buses, data ports, etc.) for operably and suitably coupling the components (radar unit 910, location unit 940, etc.

FIG. 9 is only one example of a possible radar node 900 and not intended to be limiting. Further, while the various components of the radar node 900 are shown as separate, they may be further combined and integrated, or separated or divided appropriately into sub-components operably coupled.

Referring back to the exemplary method of FIG. 8, at 805, the method includes obtaining local radar information associated with one or more radar pulses sent and/or received from the local radar device. That is, a radar node or processing circuitry of the radar node may obtain local radar information, e.g., locally generated. That is, the local radar device or local radar unit (e.g., transmitter and receiver) of a radar node may be configured to transmit and/or receive radar pulses. The local radar device may determine local radar information from the locally transmitted and/or received radar signals or pulses. The local radar information can include radar timing measurements (e.g., ToA, ToD, Doppler shift, etc.) determined or performed by the local radar device. The processing circuitry of the local radar node may obtain the local radar information (e.g., through interface circuitry) from the local radar device. The local radar information may also include position information, which may be obtained through a location unit device (e.g., GNSS receiver). In addition, the radar pulses themselves may carry information, e.g., radar related and determined information as data in radar frames. The local radar unit may obtain (e.g., extract or decode) this information from the received radar signal and transmit the information to processing circuitry for further processing.

At 810, the method includes obtaining neighboring radar information associated with radar pulses sent and/or received from one or more neighboring radar devices. For example, the radar node or the processing circuitry of a radar node may obtain neighboring radar information regarding radar pulses that were sent and/or received by neighboring radar nodes/devices. The neighboring radar information can include radar timing information and location/position information for each or some of the radar pulses. Additionally, the neighboring radar information can include identification information, e.g., information identifying the transmitter or receiver of the radar pulses, such as MAC address for the receiving and/or transmitter.

The neighboring radar information may be sent through wireless means, e.g., cellular and/or WLAN means. Thus, the radar node or the processing circuitry (e.g., through the interface circuitry) may obtain the neighboring radar information from a cellular and/or WLAN communication device. The neighboring information may be sent in packets with an identification (PID) to identify the packets carrying the neighboring radar information. Also, the radar information that may be included in the packets carrying the neighboring information may include, for example, Radar (device) ID (transmitter and/or receiver of radar signal), ToD (Time of Departure (transmission) timestamp (e.g., picosecond level)), ToA (Time of Arrival (reception) timestamp (of other RADAR packets)), AoA (Angle of Arrival (of LoS of emitters)), AoD (Angle of Departure (of beams)), Estimated Doppler/speed, Radar device/node Position (x,y,z/lat., long., height/ . . . (+uncertainty)), other related car identifying information, image data, etc. radar At 815, the method includes updating a radar data structure using the obtained local and neighboring radar information, wherein the radar data structure includes radar information for each of a plurality of radar pulses transmitted by the local radar device and the one or more neighboring radar devices. That is the local radar node or processing circuitry of the local radar node may update a locally stored or maintained data structure that includes information for radar pulses that have been sent/or received by the radar nodes in the vicinity, including radar pules sent or received by the local radar device. The data structure may be implemented as a ledger or table with entries for each radar pulse. As such, the update may include merging the current version of the local ledger with the ledger(s) or information received from the other radar nodes.

Further, the updating of the radar structure may include eliminating certain entries. That is, a local radar node may only maintain entries for radar pulses that were recent e.g., that have been transmitted or received less than a predetermined amount of time ago. In other words, the data structure may be implemented as a "sliding-window" ledger of information, such as ledger information collected during a previous duration (e.g. during the past x seconds). The size of that window may be tuned for optimizing the overall system performance. It should be emphasized that although the ledger may include various types of measurements (time, frequency, spatial/angular), the following analysis focuses on the minimal set of measurements that would enable the nodes to synchronize and determine their positions.

The well-known network problem of "hidden nodes" (namely, a node that is not "visible" to some of the nodes) can be alleviated using "aggregated ledgers". Each node forms these through merging its self-ledger with ledgers received from other nodes. This creates redundancy and enables the CoRD to fill-in the missing bits of data. Also, the "aggregated ledger" enables determining the timing parameters of the other nodes ahead of time. Notwithstanding, the data aggregation mechanism might overly increase the size of the broadcast. To circumvent this, an indication of the "distance" (in terms of network "hops"), may be added to each ledger line to limit the overall ledger size.

The proposed ledger format may be extended to include other useful types of information: inertial measurement unit/IMU data (e.g., orientation, 3-D acceleration, etc.), raw measurements of GNSS (pseudo-range and phase, which could be identified by the satellite ID and time-of-week/ TOW parameters), and so on. Again, it should be emphasized that the measurements are associated with a specific radar signal while the data itself (i.e., the ledger), could be broadcast on another medium. Next, we define the measurements used for realizing the CoRD synchronization and nodes localization.

In addition, since each radar node determines timing information (e.g., ToA or ToD) in its own local time frame or clock, the local radar may need to appropriate match (e.g., timestamp phase matching).

The method further includes, at 820, determining synchronization parameters and location parameters based on updated radar data structure. That is, the local radar node or processing circuitry thereof may apply or use the updated radar data structure to synchronize (e.g., synchronize in time, determine clock drifts between nodes) with the neighboring radar nodes as well as and localize (position or coordinates) the neighboring radar nodes.

To perform the synchronization and localization, the local radar may apply procedures/routines, such as, for example, CoRD time synchronization procedure/routine.

The method of FIG. 8 further includes, at 825, transmitting the updated radar structure. In other words, the local node may from time to time (e.g., periodically, at scheduled times, or in response to events such as updating the radar data structure) may transmit the radar structure. As described herein, the local radar node may transmit radar data structure over a broadcast channel through wireless or cellular means. The transmitted radar data or transmitted data from the updated radar data structure may be transmitted as packets and include the radar related information described herein (e.g., Radar ID, ToD, ToA, etc.). In other embodiments, the local radar node may transmit (in-band) at least some of the radar related information as data incorporated in radar pulses transmitted from the local radar node. For example, the local radar node may transmit a radar pulse with at least some radar related information related to that pulse (e.g., ToD, radar ID, etc.) as data in radar frame(s) of that radar pulse. In other examples, additional or less radar information may be incorporated in the radar pulses. That is, in some examples, the radar data structure may be transmitted in-band, e.g., as part of radar pulses sent by the local radar node, transmitted out-of-band e.g., as part of data in a WLAN, and/or cellular transmission (e.g., separate from the radar signal transmission), or the radar data structure or parts thereof can be transmitted as a combination of in-band and out-band transmission.

For out-of-band transmissions, information such as GNSS raw measurements (e.g., pseudo ranges, Doppler and delta-ranges (phase) can be shared where the satellite ID and time of week (ToW) in the satellite data can serve as an ID for the signal), Wi-Fi measurements—timing and spatial information on Wi-Fi packets, can be shared (as part of radar information/radar data structure). The transmitting MAC and approximate time can be used as ID.

In various exemplary embodiments, any frame in a communication protocol and any wireless signal can be used in a similar way as long as it can be identified among the cooperating nodes (e.g. the nodes can deduce that it measures the exact same signal)

As indicated by the arrow in FIG. 8, the actions described therein may be repeated, though, not necessarily in the same order. That is, the local radar node may repeatedly receive local and/or neighboring radar information and may repeatedly update its own radar data structure/ledger. Similarly, the local radar node may perform time synchronization and localization with other nodes (e.g., apply CoRD time synchronization procedures/routines). In various embodiments, the local radar node (as well as other nodes also performing the same or similar method) may be able synchronize on the nanosecond level.

The exemplary method of FIG. 8 may also be realized in further embodiments or variations. With the determined synchronization and localization of radar nodes via the CoRD scheme, a radar node may apply bistatic equations so as to be able to track the nodes and targets with the vicinity. That is, the use of bistatic equations enables sensing of the environment from many points of view instead of only a single one, as in the classic mono-static radar (e.g., a radar in which the transmitter and receiver are collocated). For example, the application of bistatic equations. FIG. 11 shows an example of applying bistatic equations in order to discern the environment and detect an object. The ellipse in FIG. 11 is generated as sum or ranges to detect the target. In other examples, each radar node may generate an ellipse and the intersection of the ellipses can indicate the presence of targets in the environment.

Focus will now be turned to measurements for synchronization using Emitters Relative Ranging. Let the nodes in the network be denoted by indices $\ell$ and $j$ where, $\ell \neq j$; $\ell = 0; 1, \ldots, N$ and $j = 0; 1, \ldots, N$. Every node in the ad-hoc network estimates the parameters at hand independently and considers itself as the "ego node". In the following derivation, the index 0 is reserved for the ego node.

Asynchronicity between two nodes may be measured via the time of flight (ToF) between nodes $\ell$ and $j$. The ToF may be proportional to the range between the nodes (denoted by $r_{\ell,j}$). Time synchronization relies on estimating the offset in the clock time base between two nodes. Let $v_j$ denote the clock offset of the jth node with respect to the ego node's clock, denoted by $t_0$, such that $v_j \triangleq t_j - t_0$. The measurements corresponding to the kth transmission collected by any of the nodes are assumed to be available to the other nodes as part of the updated ledger that is broadcast along with the next transmission.

The ToF measurement may be mathematically summarized as $$ToF_{\ell,j}^k = (ToA_j^k - v_j) - (ToD_\ell^k - v_\ell) = \frac{1}{c} r_{\ell,j}^k + \overline{n}_j^k \qquad (1)$$

Where $r_{l,j}^k$ denotes the range between the $\ell$th and jth nodes during the kth measurement, and c=299792458 [m/s] denotes the speed of light. It is further assumed that additive noise of the ToD measurement is negligible compared to the additive noise of the ToA measurement. Hence, the additive noise element in (1) corresponds to $\text{ToA}_j^k$ namely the ToA measurement made by the jth node and is assumed to be distributed as $\tilde{n}_j^k \sim \mathcal{N}(0, \tilde{\sigma}_j)$, with $\tilde{\sigma}_j$ denoting the standard deviation of the ToA measurement of the jth node. To measure the ToA, one may detect and estimate the delay of the LoS path. Such operation is similar to the processing executed by a conventional radar system.

Transferring the offset terms to the right hand side of (1), the definition for the ToF measurement may be obtained as $$z_{\ell,j}^k \triangleq \text{ToA}_j^k - \text{ToD}_\ell^k = \frac{1}{c} T_{\ell,j}^K + v_j - v_\ell + \tilde{n}_j^k \tag{2}$$

Let $e_i$ denote an index vector, namely an N×1 vector of zeros, whose ith entry is 1. Using this notation $$\nu_j - \nu_\ell = (e_j^T - e_\ell^T) \nu \tag{3}$$

$$\nu \triangleq [\nu_0, \ldots, \nu_{N-1}]^T \tag{4}$$

Further, since there are N radar nodes in the system, the number of possible ranges between the nodes is given by $$L = \binom{N}{2} = \frac{N!}{2(N-2)!} = \frac{N(N-1)}{2} \tag{5}$$

Let r be an L_1 vector containing all the possible ranging pairs defined as $$r \triangleq [r_{0,1}, r_{0,2}, \ldots, r_{N-1,N}]^T \tag{6}$$

Next, let $\tilde{e}_k$ be a L×1 index vector corresponding to the kth measurement. Assuming $\tilde{e}_k$ has inner indices denoted by l=1, 2, ..., L, its lth entry is 1. Using this notation $$r_{\ell,j} = e_k^T r \tag{7}$$

Further, let $\bar{e}_{k_-}$ denote an index vector corresponding to the kth measurement and indexing to the relevant entries in y, such that $$\bar{e}_k \triangleq e_j - e_\ell \tag{8}$$

$$\nu_j - \nu_\ell = \bar{e}_k^T \nu \tag{9}$$

The timing measurements may be compactly recast as $$z_k = \frac{1}{c} \tilde{e}_k^T r + \bar{e}_k^T \nu + \tilde{n}_k, k = 1, 2, \ldots, K \tag{10}$$

A second type of measurement that would facilitate synchronicity is the normalized frequency offset. Since the two radar nodes are assumed to be in motion with respect to one another, the Doppler effect may cause the frequency at which the transmission is received to deviate from the nominal carrier frequency, fc. However, the Doppler Effect is not the sole contributor to the frequency offset. The ToA and ToD timestamps may be realized by reading the values of clock counters, which typically rely on an oscillating source such as a crystal oscillator (XO). As crystals are affected by ambient temperature variations and aging among other factors, the clock offsets referenced to the crystals may drift over time. Given that same oscillator circuitry also drives the transmitter (and receiver) carrier frequencies, the frequency at which the transmission is received may also drift over time and deviate from its nominal value.

Let, $\dot{\nu}_\ell$ denote the clock offset change rate (i.e., drift) of the $\ell$th node, where for the ego node it is assumed that $\dot{\nu}_0 = 0$.

The kth measurement of normalized frequency offset of a transmission made by the lth node and received by the jth node may be defined as $$\tilde{z}_k = \frac{1}{c} \tilde{e}_k^T \dot{r} + \bar{e}_k^T \dot{\nu} + \tilde{n}_k, k = 1, 2, \ldots, K \tag{11}$$

Where $\dot{r}_{\ell,j}^k$ represents the time derivative of the range (i.e., the relative radial speed) between the $\ell$th and jth nodes during the kth measurement, and $\tilde{n}_i^k \sim \mathcal{N}(0, \tilde{\sigma}_1)$, with $\tilde{\sigma}_j$ denoting the standard deviation of the frequency offset measurement of the jth node. As the frequency offset and ToF measurements have identical structure, in vector form the kth frequency offset measurement may be recast as $$\tilde{z}_k = \frac{1}{c} \tilde{e}_k^T \dot{r} + \bar{e}_k^T \dot{\nu} + \tilde{n}_k, k = 1, 2, \ldots, K \tag{12}$$

with $$\dot{r} \triangleq [\dot{r}_{0,1}, \dot{r}_{0,2}, \ldots, \dot{r}_{N-1,N}]^T \tag{13}$$

$$\dot{\nu} \triangleq [\dot{\nu}_0, \ldots, \dot{\nu}_{N-1}]^T$$

Both (10) and (12) exhibit linear dependence in the unknown parameters: range, range-rate, clock offset and clock offset drift. The models that relate between the instantaneous clock offset and its drift and between the range and its time derivative may be summarized as $$\nu_\ell(t_i) = \nu_\ell(t_{i-1}) + \dot{\nu}_\ell \cdot \Delta t \tag{14}$$

$$r_{\ell,j}(t_i) = r_{\ell,j}(t_{i-1}) + \dot{r}_{\ell,j} \cdot \Delta t \tag{15}$$

where $r_{\ell,j}(t_{i-1}), \nu_\ell(t_{i-1})$ correspond to the previous estimated value of the range and the clock offset, respectively, with $r_{\ell,j}(t_0), \nu_\ell(t_0)$, designating their initial values, and $\Delta t = t_i - t_{i-1}$.

In the next paragraphs, measurements for synchronization using Emitters' Localization will be discussed.

The simplified, range-based synchronization model assumes the ranges are independent and ignores their inter-correlations, thus it is sub-optimal. Yet, its linearity guarantees fast and simple convergence when applied to certain adaptive filters. A more accurate synchronization model may take into account the location of the nodes. The incorporation of the location coordinates not only improves the synchronization accuracy, but the nodes' location is required for bi-static radar applications. As will be shown next, the dependence on the location coordinates renders this model non-linear. Hence, resolving its parameters requires some rough initial "guess" for the radar nodes positions (such guess may be available e.g., from GNSS and may be shared over the ledgers).

Let, $q_{\ell,k} = [x_\ell^k, y_\ell^k, z_\ell^k]^T$, $q_{j,k} = [x_j^k, y_j^k, z_j^k]^T$, denote the position coordinates vectors of the lth and jth nodes during the kth measurement, respectively. The ToF between the two endpoints may be expressed as $$z_{\ell,j}^k \triangleq ToF_{\ell,j} \equiv ToA_j^k - ToD_\ell^k \quad (16)$$

$$= \frac{1}{c}\|q_{j,k} - q_{\ell,k}\| + v_j - v_\ell + \tilde{n}_j^k$$

where the notation $\|x\|$ designates the Euclidean norm of the vector x. In (16) the range between the nodes becomes a non-linear function of the position coordinates. Let, $\mathbf{v}_{\ell,k}$ s=$[v_\ell^x, k, v_\ell^y k, v_\ell^z]^T$ denote the velocity vector of the lth radar node during the kth measurement. Using the definition of $\mathbf{v}^\ell$; k, the range-rate parameter $\dot{r}_{\ell,j}$ may be explicitly defined as $$\dot{r}_{\ell,j}^k \triangleq (v_{j,k} - v_{\ell,k})^T \frac{q_{j,k} - q_{\ell,k}}{\|q_{j,k} - q_{\ell,k}\|} \quad (17)$$

where $x^T$ denotes the transposition of the vector x. Plugging (17) back into (11), the normalized frequency offset measurement may be recast as $$z_{\ell,j}^k \triangleq \frac{\Delta f_{\ell,j}^k}{f_c} = \frac{1}{c}(v_{j,k} - v_{\ell,k})^T \frac{q_{j,k} - q_{\ell,k}}{\|q_{j,k} - q_{\ell,k}\|} + \dot{v}_j - \dot{v}_\ell + \tilde{n}_j^k \quad (18)$$

Let the matrices $\pi$ and V collect all the nodes' coordinate and velocity vectors (defined in a unified (local or global) coordinates system).

$$\Pi_k \triangleq [q_{0,k}, q_{1,k}, \ldots, q_{N-1,k}] \quad (19)$$

$$V_k \triangleq [v_{0,k}, v_{1,k}, \ldots, v_{N-1,k}] \quad (20)$$

Using this notation and the definition of (8), (16) and (18) may be recast as $$z_{\ell,j}^k = \frac{1}{c}\left(\bar{e}_k^T \prod_k^T \prod_k \bar{e}_k\right)^{\frac{1}{2}} + \bar{e}_k^T v + \tilde{n}_j^k \quad (21)$$

$$z_{\ell,j}^k = \frac{1}{c} \frac{\bar{e}_k^T V_k^T \prod_k \bar{e}_k}{\left(\bar{e}_k^T \prod_k^T \prod_k \bar{e}_k\right)^{\frac{1}{2}}} + \bar{e}_k^T \dot{v} + \tilde{n}_j^k \quad (22)$$

In the following section, the procedures/routines that enable the ego node to synchronize and track its relative position with respect to other radar nodes in the network are described. The procedures/routines presented include a Kalman filter (KF) that can track the interranges and clock offsets between the nodes. The linearity of the KF enables it to be used as an initial guess for an extended KF (EKF), which may be used in order to estimate and track also the 3-dimensional locations and velocities (in addition to the clock offsets) of the nodes in the virtual network. The procedures/routines described next are assumed to be executed by each radar node, enabling it to estimate and track its own position coordinates, as well as the timing parameters of the other nodes, from which it receives the measurement broadcasts.

The Kalman Filter (KF) may be the optimal estimate for linear system models with additive independent white Gaussian noise in both the system and the measurement models. The KF system model is defined by the following recursive equation, $$x_k = F_k x_{k-1} + w_k, k \geq 0 \quad (23)$$

where the index k denotes the discrete time-step. The vector $x_k$ denotes an M×1 states vector, which describes the parameters being estimated and tracked by the filter. Since $$L = \frac{N(N-1)}{2}$$

the states vector for each radar node consists of the 2L ranges and range derivatives with respect to the other nodes, and also a 2N nodes' clock parameters (clock offset and its change rate). The KF state-vector is defined as $$x_k \triangleq [r^T, \dot{r}^T, v^T, \dot{v}^T]^T \quad (24)$$

The number of states thus equals:

$$M = 2\frac{N(N-1)}{2} + 2N = 2L + 2N = N^2 + N.$$

The dynamic system-model linear transfer function is denoted by Fk, an M_M block-diagonal matrix defined as follows, $$F_k \triangleq \begin{bmatrix} I_L & \Delta t I_L & 0 & 0 \\ 0 & I_L & 0 & 0 \\ 0 & 0 & I_N & \Delta t I_N \\ 0 & 0 & 0 & I_N \end{bmatrix} \quad (25)$$

where $\Delta t$ corresponds to the elapsed time between two consecutive discrete time steps.

The vector $w_k$ denotes a random M×1 model noise vector. In the KF system model, the process noise, $w_k$ is assumed to be Gaussian-distributed with zero-mean and a covariance matrix, $Q_k$. In general, the determination of the noise variance values of $Q_k$, is challenging, and is often obtained by some heuristic methods. Typically, the standard deviation values corresponding to the ranges and their derivatives are determined according to the motion assumptions of the radar (e.g., mounted on a vehicle/drone, fixed-node etc.) The KF's kth measurement model is defined as $$z_k = Hx_k + n_k \quad (26)$$

where $$z_k \triangleq [\bar{z}_k, \tilde{z}_k]^T, n_k \triangleq [\bar{n}_k, \tilde{n}_k]^T \quad (27)$$

$$H \triangleq \begin{bmatrix} \frac{1}{c}\bar{e}_k^T & 0_L^T & \bar{e}_k^T & 0_N^T \\ 0_L^T & \frac{1}{c}\bar{e}_k^T & 0_N^T & \bar{e}_k^T \end{bmatrix} \quad (28)$$

with 0n denoting a vector of 0's of length n. The vector nk denotes the additive measurement noise vector that is assumed to be Gaussian, with zero mean, independent from one measurement to another with standard deviations.

For joint synchronization and localizing of the radar nodes surrounding it, the node should execute an extended Kalman filter (EKF). The EKF forms a linearized extension for the KF to handle non-linear measurement models, as in the case of (16) and (18). In the case of the EKF, the state-vector depends explicitly on the 3-D position and velocity vectors and is defined as $$x_k \triangleq [vec\{\Pi\}^T, vec\{V\}^T, v^T, \dot{v}^T]^T \quad (29)$$

where vec{X} denotes stacking the columns of the matrix X. The size of the EKF state vector is thus: $\tilde{M}=(2\cdot 3N+2\cdot N)=8N$. The dynamic system-model linear transfer function is denoted by $F_k$, an 8N X_8N block-diagonal matrix defined as follows.

$$F_k \triangleq \begin{bmatrix} I_{3N} & \Delta t I_{3N} & 0 & 0 \\ 0 & I_{3N} & 0 & 0 \\ 0 & 0 & I_N & \Delta t I_N \\ 0 & 0 & 0 & I_N \end{bmatrix} \quad (30)$$

The EKF's measurement model is defined as $$z_k = h(x_k) + n_k \quad (31)$$

where the vectors zk and nk are defined similar to (26). As previously discussed, there are multiple types of transfer functions, which depend on the type of the measurement. From (21)-(22) it can be seen that the corresponding measurement transfer functions are given by $$h \triangleq [\bar{h}(x_k), \tilde{h}(x_k)], \text{ with} \quad (32)$$

$$\bar{h}(x_k) = \frac{1}{c}\left(\bar{e}_k^T \prod_k^T \prod_k \bar{e}_k\right)^{\frac{1}{2}} + \bar{e}_k^T v$$

$$\tilde{h}(x_k) = \frac{1}{c}\frac{\bar{e}_k^T V_k^T \prod_k \bar{e}_k}{\left(\bar{e}_k^T \prod_k^T \prod_k \bar{e}_k\right)^{\frac{1}{2}}} + \bar{e}_k^T \dot{v} \quad (33)$$

Since the dependence of the measurement transfer functions on the filter states is nonlinear, it needs to be linearized by replacing it with its first order Taylor series expansion, calculated around $\hat{x}_{k|k-1}$:

$$h(x_k) \cong h(\hat{x}_{k|k-1}) + H_k \cdot (x_k - \hat{x}_{k|k-1}) \quad (34)$$

where the notation, $\hat{x}_{u|m}$ represents the estimate of x at time n given observations up to and including time m≤n. The matrix $H_k$ denotes the Jacobian of the measurement model function vector h(·), which is a K×N matrix defined as, $$H_k \triangleq \begin{bmatrix} \frac{\partial \bar{h}_k}{\partial x_1} & \frac{\partial \bar{h}_k}{\partial x_2} & \cdots & \frac{\partial \bar{h}_k}{\partial x_{\tilde{M}}} \\ \frac{\partial \tilde{h}_k}{\partial x_1} & \frac{\partial \tilde{h}_k}{\partial x_2} & \cdots & \frac{\partial \tilde{h}_k}{\partial x_{\tilde{M}}} \end{bmatrix} \quad (35)$$

The Jacobian is obtained by calculating the partial derivatives of (32)-(33). Equations (36)-(38) define the corresponding partial derivatives for the different measurement types included in the matrix $H_k$.

$$\frac{\partial \bar{h}_k}{\partial q_j} = \frac{1}{c}\frac{\prod_k \bar{e}_k}{\left(\bar{e}_k^T \prod_k^T \prod_k \bar{e}_k\right)^{\frac{1}{2}}}, \frac{\partial \bar{h}_k}{\partial v} = \bar{e}_k \quad (36)$$

$$\frac{\partial \tilde{h}_k}{\partial q_j} = \frac{1}{c}\frac{\bar{e}_k^T V_k^T}{\left(\bar{e}_k^T \prod_k^T \prod_k \bar{e}_k\right)^{\frac{1}{2}}} - \frac{1}{c}\frac{\bar{e}_k^T V_k^T \prod_k \bar{e}_k \bar{e}_k^T \prod_k^T}{\left(\bar{e}_k^T \prod_k^T \prod_k \bar{e}_k\right)^{\frac{3}{2}}} \quad (37)$$

$$\frac{\partial \tilde{h}_k}{\partial v_j} = \frac{1}{c}\frac{\prod_k \bar{e}_k}{\left(\bar{e}_k^T \prod_k^T \prod_k \bar{e}_k\right)^{\frac{1}{2}}}, \frac{\partial \tilde{h}_k}{\partial \dot{v}} = \bar{e}_k \quad (38)$$

To accelerate the EKF convergence, the initial values for $\hat{v}_0$ and $\hat{v}_0$, may be obtained using the linear KF defined in the previous section. The initial position estimates, denoted $\hat{\Pi}_0$, by may be obtained from GNSS estimates, which are typically accurate to about 10-15 meters. This accuracy might be marginal in case the range between the nodes is in the order (or even shorter) than the error of the initial guess. In such case, the non-linearity errors are more prominent. Such measurements may be omitted and not be fed into the filter.

From implementation perspective, it may be simpler to assume that the ego's coordinates define the origin of a local coordinates frame (frame) and the positions and velocities of all the other nodes are referenced to it. To ensure these state values remain at 0 (including the ego's clock offset), one must feed the EKF with pseudo-measurements of these states.

As the nodes' clocks drift over time, the accuracy of the crystals used as the nodes' clock sources, dictates the broadcast rate. Cheap crystals, such as utilized in Wi-Fi systems, require at least 2-3 broadcasts per second. Crystals with higher accuracy allow reducing the broadcasting rate.

The minimal number of nodes required to resolve all the parameters (position coordinates and clock offsets), depends on the available information. If only range information is available, it can be readily shown that at least four nodes are required. Angular information (which was not considered here for simplicity), combined with range information, provides a position estimate using only a single node.

The timing accuracy is mostly affected by the signal bandwidth. It has been shown that for CToA using signal bandwidth of 40 MHz, positioning accuracy of 1.5 m (equivalent to 5 nanoseconds), can be achieved at 95% of the time. For automotive radar applications, employing bandwidth, which is roughly 10 times higher, sub-nanosecond accuracy is expected.

A novel protocol for synchronization between cooperative automotive radar nodes is presented herein. The protocol relies on the cooperation of various measurement types (time-delay, frequency offset, spatial-angular and others), contained in a "ledger" that may be distributed either in-band or out-of-band between the nodes that form the virtual radar network. The protocol facilitates sub-nanosecond level synchronization between the nodes and localizes them very accurately (at the decimeter level). This enables higher-levels of inter-nodes cooperation (e.g., bistatic radar formation), such that the node could benefit from the interfering transmissions generated by the other nodes in its vicinity. The implementation of this mechanism relies on the classical Kalman-filter (and its nonlinear extension).

Further a local radar node may share information regarding "non-collaborative targets" such as for example, bikes, pedestrians. For example, reduced-complexity radar devices (with single transmit and receive elements) can be attached to objects (e.g., bicycles) to enhance their visibility and improve their safety.

In addition, radar images from the radar nodes may be able to be combined so as to combat radar cross section (RCS) scintillation.

Further, the synchronization and localization performed by a CoRD scheme may be used in calibration applications, e.g., a transmitted signal can be used for calibrating other units in the network.

In further embodiments, the method described herein may perform Ring measurement. That is a radar node may include measuring amount of times entry of the radar structure are being re-broadcast from all who hear it. It may be beneficial to limit the number of re-broadcast messages according to the indirectivity extent of the message. Accordingly, a radar node may include a parameter R for each line (e.g., each radar pulse) in the radar data structure/or ledger. When a participating radar node merges a radar pulse information (e.g., an entry row or line) which was received from several other nodes with its own line, it may updates the R parameter according to the following formula $R=\min\{R_i\}+1$, where i is the index over the neighbor nodes for the specific line or radar signal or pule entry. In case this line was measured first by the node itself than R=0. In the broadcast ledger only line with R less than a predetermined threshold will be broadcast by the radar node.

In further embodiments described herein, information which can facilitate the synchronization/positioning/bi-static calculation may be shared or transmitted between nodes participating in the CoRD scheme, such as, GNSS position and timing solution (as opposed to raw measurement) of the radar node itself, which can be used as initial guess for convergence or as additional source, orientation of the RADAR (can be available from inertial sensors/GNSS fusion solution in each object/vehicle). Furthermore, other information that maybe transmitted between radar nodes may relate to the object hosting the radar node. For example, in the case of vehicles, the information may include Model, type, shape (bounding box), license plate, position, velocity.

In further embodiments, reference "beacons" may be deployed. The beacons can participate in the CoRD scheme by acting as a "fixed" or stationary radar node. For example, the radar node may be implemented in a traffic light or lamp post and may allow the other radar nodes (e.g., radar nodes implemented in moving vehicles) to map or see objects or targets in various places (e.g., around the corner).

In further embodiments, the application of the CoRD scheme described herein may be used for other applications including 3D mapping (e.g., 3D venue modeling using crowd source data).

While various embodiments, describe or depict the radar nodes as part of automotive vehicles, this is not necessarily so and the radar nodes may be used or implemented in other types of objects including other objects (e.g., drones, bicycles, scooters, robots, etc.) or people (e.g., handheld devices). Further, while embodiments are described in connection with radar, the methods and devices may be applied to other technologies such as LIDAR.

The following examples pertain to further exemplary implementations.

Example 1 is a method including obtaining local radar information associated with one or more radar pulses sent and/or received from the local radar device; obtaining neighboring radar information associated with radar pulses sent and/or received from one or more neighboring radar devices; and updating a radar data structure using the obtained local and neighboring radar information, wherein the radar data structure includes radar information for each of a plurality of radar pulses transmitted by the local radar device and the one or more neighboring radar devices.

Example 2 is the method of example 1, further including transmitting at least a portion of the updated radar data structure to one or more neighboring devices associated respectively with the one or more neighboring radar devices.

Example 3 is the method of example 1 or 2, further including determining, based on the updated radar structure, synchronization parameters and location parameters with at least one of the one or more neighboring devices.

Example 4 is the method of any of examples 1 to 3, wherein updating the radar structure further includes merging currently obtained local radar information and/or currently obtained neighboring radar information with existing radar information.

Example 5 is the method of any of examples 1 to 4, wherein the radar information of radar data structure includes radar timing information including time-of-arrival (ToA) data and time-of-departure (ToD) data respectively for radar pulses transmitted by the local radar device and/or the one or more neighboring radar devices.

Example 6 is the method of any of examples 1 to 5, wherein the radar information of the radar data structure includes an identification (ID) for each one or more of the radar pulses.

Example 7 is the method of example 6, wherein the ID includes a transmitter ID indicating the identity of transmitter of the respective radar pulse.

Example 8 is the method of example 6 or 7, wherein the ID includes a receiver ID indicating the identity of receiver of the respective radar pulse.

Example 9 is the method of any of examples 1 to 8, wherein the radar information of the radar structure includes spatial information respectively for one or more the radar pulses, the spatial information including an angle of departure (AoD) data and/or an angle of arrival (AoA) data for the respective radar pulse.

Example 10 is the method of any of examples 1 to 9, wherein the radar information of the radar structure includes a Doppler frequency offset.

Example 11 is the method of example 2, wherein transmitting at least one portion of the updated radar data structure includes wirelessly transmitting the at least one portion of the updated radar data structure over a broadcast channel.

Example 12 is the method of example 2, wherein transmitting at least one portion of the updated radar data structure includes wirelessly transmitting the at least one portion of the updated radar data structure via one or more radar pulses.

Example 13 is the method of any of examples 1 to 12, wherein one or more of the radar pulses sent and/or received by the local radar device or the neighboring radar device are backscattered radar pulses.

Example 14 is the method of any of examples 1 to 13, further including generating, by the radar device, the local radar information based on the one or more radar pulses sent and/or received by the local radar device.

Example 15 is the method of any of examples 1 to 14, further including receiving, wirelessly, from one or more of the neighboring devices, the neighboring radar information.

Example 16 is the method of example 15, further including wirelessly receiving at least a portion of the neighboring radar information via a broadcast channel.

Example 17 is the method of example 15, further including wirelessly receiving at least a portion of the neighboring radar information via radar pulses sent from the one or more neighboring devices.

Example 18 is an apparatus including a local radar device configured to transmit and receive radar signals; a wireless device configured to wirelessly transmit and receive data; at least one processor operably coupled to the wireless transmitter, wireless receiver, and the radar device, the at least one processor configured to perform a method including: obtaining local radar information regarding one or more radar pulses sent and/or received by the local radar device; obtaining neighboring radar information associated with radar pulses sent and/or received from one or more neighboring radar devices; and updating a radar data structure using the obtained local and neighboring radar information, wherein the radar data structure includes radar information for each of a plurality of radar pulses transmitted by the local radar device and/or the one or more neighboring radar devices.

Example 19 is the apparatus of example 18, the method performed by the at least one processor further including causing the wireless device to transmit at least a portion of the updated radar data structure to one or more neighboring devices associated respectively with the one or more neighboring radar devices.

Example 20 is the apparatus of example 19, the method performed by the at least one processor further including determining, based on the updated radar structure, synchronization parameters and location parameters with at least one of the one or more neighboring devices.

Example 21 is the apparatus of any of examples 18 to 20, wherein updating radar structure further includes the at least one processor merging currently obtained local radar information and/or currently obtained neighboring radar information with existing radar information.

Example 22 is the apparatus of any of examples 18 to 21, wherein the radar information of radar data structure includes radar timing information including time-of-arrival (ToA) data and time-of-departure (ToD) data respectively for radar pulses transmitted by the local radar device and the one or more neighboring radar devices.

Example 23 is the apparatus of any of examples 18 to 22, wherein the radar information of the radar structure includes an identification (ID) for each of one or more of the radar pulses.

Example 24 is the apparatus of example 23, wherein the ID includes a transmitter ID indicating the identity of transmitter of the respective radar pulse.

Example 25 is the apparatus of example 23, wherein the ID includes a receiver ID indicating the identity of receiver of the respective radar pulse.

Example 26 is the apparatus of any of examples 18 to 25, wherein the radar information of the radar structure includes spatial information respectively for one or more the radar pulses, the spatial information including an angle of departure (AoD) data and/or an angle of arrival (AoA) data for each respective radar pulse.

Example 27 is the apparatus of any of examples 18 to 26, wherein the radar information of the radar structure includes a Doppler frequency offset.

Example 28 is the apparatus of example 19, wherein causing the wireless transmitter to transmit at least one portion of the updated radar data structure includes causing the wireless transmitter to transmit the at least one portion of the updated radar data structure over a broadcast channel Example 29 is the apparatus of example 19, wherein causing the wireless transmitter to transmit at least one portion of the updated radar data structure includes causing the wireless transmitter to transmit the at least one portion of the updated radar data structure via one or more radar pulses.

Example 30 is the apparatus of any of examples 18 to 29, wherein one or more of the radar pulses sent and/or received by the local radar device or the neighboring radar device are backscattered radar pulses.

Example 31 is the apparatus of any of examples 18 to 30, wherein the local radar device is configured to generate at least part of the local radar information based on the one or more radar pulses sent and/or received at the local radar device.

Example 32 is the apparatus of example 31, wherein the local radar device is configured to incorporate the generated local radar information into radar pulses sent by the local radar device.

Example 33 is the apparatus of any of examples 18 to 32, wherein the local radar device is configured to extract at least part of neighboring radar information from the one or more radar pulses received by the local radar device, and wherein obtaining the local radar information by the at least one processor includes the at least one processor obtaining the extracted neighboring radar information from the local radar device.

Example 34 is the apparatus of any of examples 18 to 33, wherein the wireless device is configured to receive from one or more of the neighboring devices, at least part of the neighboring radar information, and wherein the obtaining the local radar information by the at least one processor includes the at least one processor obtaining the at least part of the neighboring radar information received by the wireless device.

Example 35 is the apparatus of example 34, wherein the wireless device is configured to receive at least a portion of the neighboring radar information via a broadcast channel.

Example 36 is an apparatus including interface circuitry; and processing circuitry operably coupled to the interface circuitry, the processing circuitry to: obtain, via the interface circuitry, local radar information associated with one or more radar pulses sent and/or received from the local radar device; obtain, via the interface circuitry, neighboring radar information associated with radar pulses sent and/or received from one or more neighboring radar devices; and update a radar data structure using the obtained local and neighboring radar information, wherein the radar data structure includes radar information for each of a plurality of radar pulses transmitted by the local radar device and the one or more neighboring radar devices.

Example 37 is the apparatus of example 36, the processing circuitry to further: transmit, via the interface circuitry, at least a portion of the updated radar data structure to one or more neighboring devices associated respectively with the one or more neighboring radar devices.

Example 38 is the apparatus of example 37, the processing circuitry to further determine, based on the updated radar structure, synchronization parameters and location measurement with at least one of the one or more neighboring devices.

Example 39 is the apparatus of any of examples 36 to 38 wherein, the processing circuitry to update radar structure includes the processing circuitry to merge currently obtained local radar information and/or currently obtained neighboring radar information with existing radar information of the radar structure.

Example 40 is the apparatus of any of examples 36 to 39, wherein the radar information of radar data structure includes radar timing information including time-of-arrival (ToA) data and time-of-departure (ToD) data respectively for radar pulses transmitted by the local radar device and the one or more neighboring radar devices.

Example 41 is the apparatus of any of examples 36 to 40, wherein the radar information of the radar structure includes an ID respectively for each of one or more of the radar pulses.

Example 42 is the apparatus of example 41, wherein the ID for each of one or more of the radar pulses includes a transmitter ID indicating the identity of transmitter of the respective radar pulse.

Example 43 is the apparatus of example 41, wherein the ID for each of one or more of the radar pulses includes a receiver ID indicating the identity of a receiver of the respective radar pulse.

Example 44 is the apparatus of any of examples 36 to 43, wherein the radar information of the radar structure includes spatial information respectively for one or more the radar pulses, the spatial information including an angle of departure (AoD) data and/or an angle of arrival (AoA) data for the respective radar pulse.

Example 45 is the apparatus of any of examples 36 to 44, wherein the radar information of the radar structure includes a Doppler frequency offset.

Example 46 is the apparatus of example 37, wherein the processing circuitry to transmit at least one portion of the updated radar data structure includes the processing circuitry to wirelessly transmit, via the interface circuitry, the at least one portion of the updated radar data structure over a broadcast channel.

Example 47 is the apparatus of example 37, wherein the processing circuitry to transmit at least one portion of the updated radar data structure includes wirelessly transmitting, via the interface circuitry, the at least one portion of the updated radar data structure in one or more radar pulses.

Example 48 is the apparatus of any of examples 36 to 47, wherein one or more of the radar pulse sent and/or received by the local radar device or the neighboring radar device are backscattered radar pulses.

Example 49 is the apparatus of any of examples 36 to 48, wherein the processing circuitry to further: receive, via the interface circuitry, from one or more of the neighboring devices, the neighboring radar information.

Example 50 is the apparatus of example 49 wherein the processing circuitry to further: receive, via the interface circuitry, at least a portion of the neighboring radar information via a broadcast channel.

Example 51 is the apparatus of example 49, wherein the processing circuitry to further: receive, via the interface circuitry, at least a portion of the neighboring radar information via radar pulses sent from the one or more neighboring devices.

Example 52 is a non-volatile computer readable medium including instructions that when executed by at least one processor of a radar node device, causes the radar node device to obtain local radar information regarding one or more radar pulses sent and/or received by the local radar device; obtain neighboring radar information associated with radar pulses sent and/or received from one or more neighboring radar devices; updating a radar data structure using the obtained local and neighboring radar information, wherein the radar data structure includes radar information for each of a plurality of radar pulses transmitted by the local radar device and/or the one or more neighboring radar devices; transmitting at least a portion of the updated radar data structure to one or more neighboring devices associated respectively with the one or more neighboring radar devices; and determining, based on the updated radar structure, synchronization parameters and location parameters with at least one of the one or more neighboring devices.

It should be noted that one or more of the features of any of the examples above may be combined with any one of the other examples.

While the invention has been particularly shown and described with reference to specific embodiments, it should be understood by those skilled in the art that various changes in form and detail may be made therein without departing from the spirit and scope of the disclosure.

The invention claimed is:

1. An apparatus comprising:
 a local radar device configured to transmit and receive radar signals;
 a wireless device configured to wirelessly transmit and receive data;
 at least one processor operably coupled to the wireless device and the local radar device, and the at least one processor configured to:
  obtain local radar information regarding one or more radar pulses sent and/or received by the local radar device;
  obtain neighboring radar information associated with radar pulses sent and/or received from one or more neighboring radar devices; and
  update a radar data structure using the obtained local and neighboring radar information, wherein the radar data structure comprises radar information for each of a plurality of radar pulses transmitted by the local radar device and the one or more neighboring radar devices;
  wherein the radar information of the radar data structure comprises radar timing information comprising time-of-arrival (ToA) data and time-of-departure (ToD) data respectively for radar pulses transmitted by the local radar device, and the one or more neighboring radar devices.

2. The apparatus of claim 1, wherein the at least one processor is further configured to cause the wireless device to transmit at least a portion of the updated radar data structure to one or more neighboring devices associated respectively with the one or more neighboring radar devices.

3. The apparatus of claim 2, wherein the at least one processor is further configured to determine, based on the updated radar data structure, synchronization parameters and location parameters with at least one of the one or more neighboring devices.

4. The apparatus of claim 1, wherein updating the radar data structure further comprises the at least one processor merging currently obtained local radar information and/or currently obtained neighboring radar information with existing radar information.

5. The apparatus of claim 1, wherein the radar information of the radar data structure comprises an identification (ID) for each of one or more of the radar pulses.

6. The apparatus of claim 5, wherein the ID comprises a transmitter ID indicating an identity of a transmitter of the respective radar pulse and/or wherein the ID comprises a receiver ID indicating an identity of a receiver of the respective radar pulse.

7. The apparatus of claim 1, wherein the radar information of the radar data structure comprises spatial information respectively for one or more the radar pulses, the spatial information comprising an angle of departure (AoD) data and/or an angle of arrival (AoA) data for each respective radar pulse.

8. The apparatus of claim 1, wherein the radar information of the radar data structure comprises a Doppler frequency offset.

9. The apparatus of claim 2, wherein causing the wireless device to transmit at least one portion of the updated radar data structure comprises causing the wireless device to transmit the at least one portion of the updated radar data structure over a broadcast channel.

10. The apparatus of claim 8, wherein causing the wireless device to transmit at least one portion of the updated radar data structure comprises causing the wireless device to transmit the at least one portion of the updated radar data structure via one or more radar pulses.

11. The apparatus of claim 1, wherein one or more of the radar pulses sent and/or received by the local radar device or the neighboring radar device are backscattered radar pulses.

12. The apparatus of claim 1, wherein the local radar device is configured to generate at least part of the local radar information based on the one or more radar pulses sent and/or received at the local radar device.

13. The apparatus of claim 1, wherein the local radar device is configured to extract at least part of neighboring radar information from the one or more radar pulses received by the local radar device, and wherein obtaining the local radar information by the at least one processor comprises the at least one processor obtaining the extracted neighboring radar information from the local radar device.

14. The apparatus of claim 1, wherein the wireless device is configured to receive from one or more of the neighboring devices, at least part of the neighboring radar information, and wherein the obtaining the local radar information by the at least one processor comprises the at least one processor obtaining the at least part of the neighboring radar information received by the wireless device.

15. The apparatus of claim 2, wherein the at least one processor is further configured to transmit, via an interface, at least a portion of the updated radar data structure to one or more neighboring devices associated respectively with the one or more neighboring radar devices.

16. A vehicle, comprising:
an apparatus, comprising:
a local radar device configured to transmit and receive radar signals;
a wireless device configured to wirelessly transmit and receive data;
at least one processor operably coupled to the wireless device and the local radar device, and
the at least one processor configured to:
obtain local radar information regarding one or more radar pulses sent and/or received by the local radar device;
obtain neighboring radar information associated with radar pulses sent and/or received from one or more neighboring radar devices; and
update a radar data structure using the obtained local and neighboring radar information, wherein the radar data structure comprises radar information for each of a plurality of radar pulses transmitted by the local radar device and/or the one or more neighboring radar devices;
wherein the radar information of the radar data structure comprises radar timing information comprising time-of-arrival (ToA) data and time-of-departure (ToD) data respectively for radar pulses transmitted by the local radar device, and the one or more neighboring radar devices.

17. The vehicle of claim 16, wherein the at least one processor is further configured to cause the wireless device to transmit at least a portion of the updated radar data structure to one or more neighboring devices associated respectively with the one or more neighboring radar devices.

18. The vehicle of claim 16, wherein the at least one processor is further configured to determine, based on the updated radar data structure, synchronization parameters and location parameters with at least one of the one or more neighboring devices.

19. A means for radar synchronization, comprising:
a processing means, for:
obtaining local radar information associated with one or more radar pulses sent and/or received from a local radar device;
obtaining neighboring radar information associated with radar pulses sent and/or received from one or more neighboring radar devices; and
updating a radar data structure using the obtained local and neighboring radar information;
wherein the radar data structure comprises radar information for each of a plurality of radar pulses transmitted by the local radar device and the one or more neighboring radar devices;
wherein the radar information of the radar data structure comprises radar timing information comprising time-of-arrival (ToA) data and time-of-departure (ToD) data respectively for radar pulses transmitted by the local radar device, and the one or more neighboring radar devices.

20. The means for radar synchronization of claim 19, wherein the means is further for transmitting at least a portion of the updated radar data structure to one or more neighboring devices associated respectively with the one or more neighboring radar devices.

21. The means for radar synchronization of claim 19, wherein the means is further for determining, based on the updated radar data structure, synchronization parameters and location parameters with at least one of the one or more neighboring devices.

22. The means for radar synchronization of claim 19, wherein updating the radar data structure further comprises merging currently obtained local radar information and/or currently obtained neighboring radar information with existing radar information.

23. A non-transitory computer readable medium comprising instructions that when executed by at least one processor of a radar node device, cause the radar node device to:
obtain local radar information regarding one or more radar pulses sent and/or received by the local radar device;
obtain neighboring radar information associated with radar pulses sent and/or received from one or more neighboring radar devices; and
update a radar data structure using the obtained local and neighboring radar information, wherein the radar data structure comprises radar information for each of a plurality of radar pulses transmitted by the local radar device and/or the one or more neighboring radar devices;
transmit at least a portion of the updated radar data structure to one or more neighboring devices associated respectively with the one or more neighboring radar devices; and
determine, based on the updated radar data structure, synchronization parameters and location parameters with at least one of the one or more neighboring devices;
wherein the radar information of the radar data structure comprises radar timing information comprising time-of-arrival (ToA) data and time-of-departure (ToD) data respectively for radar pulses transmitted by the local radar device, and the one or more neighboring radar devices.

24. The non-transitory computer readable medium of claim 23, wherein the instructions are configured to cause the one or more processors to transmit at least a portion of the updated radar data structure to one or more neighboring devices associated respectively with the one or more neighboring radar devices.

25. The apparatus of claim 1, wherein the radar information of the radar data structure further comprises frequency shift for at least one frame of received radar information, wherein the frequency shift corresponds to at least one of a Doppler shift or a clock drift.

* * * * *